United States Patent [19]

Takagi et al.

[11] Patent Number: 5,153,847
[45] Date of Patent: Oct. 6, 1992

[54] ARITHMETIC PROCESSOR USING SIGNED DIGIT REPRESENTATION OF INTERNAL OPERANDS

[75] Inventors: Naofumi Takagi, Kyoto; Tsuguyasu Hatsuda, Osaka; Toru Kakiage, Hyogo; Takashi Taniguchi; Tamotsu Nishiyama, both of Osaka, all of Japan

[73] Assignee: Matsushita Electric Industrial Co., Ltd., Osaka, Japan

[21] Appl. No.: 599,275

[22] Filed: Oct. 16, 1990

Related U.S. Application Data

[63] Continuation of Ser. No. 199,318, May 26, 1988, abandoned, which is a continuation-in-part of Ser. No. 66,817, Jun. 25, 1987, Pat. No. 4,873,660, and a continuation-in-part of Ser. No. 70,565, Jul. 7, 1987, Pat. No. 4,878,192, and a continuation-in-part of Ser. No. 74,892, Jul. 17, 1987, Pat. No. 4,866,653, and a continuation-in-part of Ser. No. 74,971, Jul. 17, 1987, Pat. No. 4,864,528, and a continuation-in-part of Ser. No. 86,967, Aug. 18, 1987, Pat. No. 4,866,657, and a continuation-in-part of Ser. No. 95,525, Sep. 10, 1987, Pat. No. 4,868,777, and a continuation-in-part of Ser. No. 136,365, Dec. 22, 1987, Pat. No. 4,935,892.

[30] Foreign Application Priority Data

May 27, 1987 [JP] Japan ................. 62-130528
May 29, 1987 [JP] Japan ................. 62-135069

[51] Int. Cl.$^5$ ................................. G06F 7/49
[52] U.S. Cl. ................................. 364/746.2
[58] Field of Search ............ 364/746.2, 768, 754, 364/760, 761

[56] References Cited

U.S. PATENT DOCUMENTS

| | | | |
|---|---|---|---|
| 4,230,908 | 10/1980 | Davis et al. | 364/768 |
| 4,590,584 | 5/1986 | Yaguchi et al. | 364/748 |
| 4,628,472 | 12/1986 | Fensch | 364/759 |
| 4,638,449 | 1/1987 | Frey | 364/760 |
| 4,791,601 | 12/1988 | Tanaka | 364/760 |
| 4,864,528 | 9/1989 | Nishiyama et al. | 364/746.2 |
| 4,871,270 | 3/1989 | Nash | 364/760 |

OTHER PUBLICATIONS

Avizienis, "Binary-Compatible Signed-Digit Arithmetic" *Proceedings—Fall Joint Computer Conf.*, 1964 pp. 663-672.

Hwang, *Computer Arithmetic, Principles, Architecture and Design* John Wiley & Sons 1979 pp. 149-151.

A VLSI-Oriented High-Speed Divider Using Redundant Binary Representation, Takagi, et al., IECE Japan, vol. 167, D #4 pp. 450-457.

A VLSI-Oriented High-Speed Multiplier Using Redundant Binary Adder Tree, Takagi, et al., IECE Japan, vol. J66.d, pp. 683-690.

A New Class of Digital Division Methods, James Robertson, IRE Transactions on Electronic Computers, pp. 218-222.

Signed-Digit Number Representations for Fast Parallel Arithmetic, Avizienis, IRE Transactions on Electronic Computers pp. 389-400.

A Class of Binary Divisions Yielding Minimally Represented Quotients Metze IRE Transactions on Electronic Computers, pp. 761-764.

Design of the Arithmetic Units of ILLIAC III, Redundancy & Higher Radix Methods, Atkins, IEEE Transacts. on Computers vol. C-19, pp. 720-732.

Multiple Operand Addition and Multiplication, Shanker Singh et al. IEEE Transactions on Computers, vol. C-22, No. 2 pp. 113-120.

Concise Papers, Lyon, IEEE Transactions on Communications, pp. 418-425.

Real-Time Processing Gains Ground with Fast Digital Multiplier, Waser, et al. Electronics, pp. 93-99.

High Speed Multiplier Using A Redundant Binary Adder tree, Harata, et al. IEEE International Conference on Computer Design, pp. 165-170, 1984.

High Speed VLSI Multiplication Algorithm With A Redundant Binary Array Addition Tree, Takagi, et al. IEEE Transactions on Computers, vol. C-34, No. 9, pp. 1789-1795.

Design of High Speed MOS Multiplier and Divider Using Redundant Binary Representation, Kuninobu, et al., Proceedings 8th Symposium on Computer Arithmetic, pp. 80-86.

*Primary Examiner*—David H. Malzahn

*Attorney, Agent, or Firm*—Amster, Rothstein & Ebenstein

[57] ABSTRACT

This invention discloses an arithmetic processor which represents internal arithmetic operands as signed-digit numbers, each digit of which may have either positive, zero, or negative values and which executes addition of a plurality of numbers each of whose most significant digit is offset with respect to the other numbers. The arithmetic processor includes an adder tree which is so constituted that a pair of said plurality of numbers are added to obtain a partial sum and further pairs of partial sums are successively added to obtain a final sum of all numbers. The arithmetic processor further comprises first means for adding a portion of the two numbers where both digits are present, second means for causing a lower order portion where only one of the numbers has a digit present to directly become part of the sum, third means for retaining or outputting a carry created by the first means, and fourth means for adding the carry created in each add stage of the adder tree to the later add stages of the adder tree to obtain the sum.

3 Claims, 15 Drawing Sheets

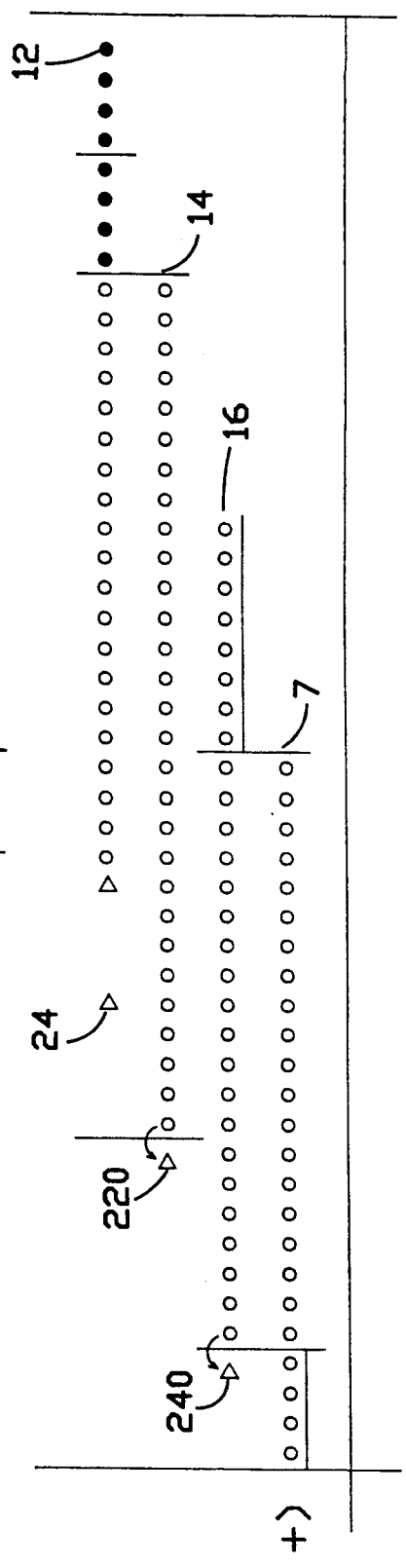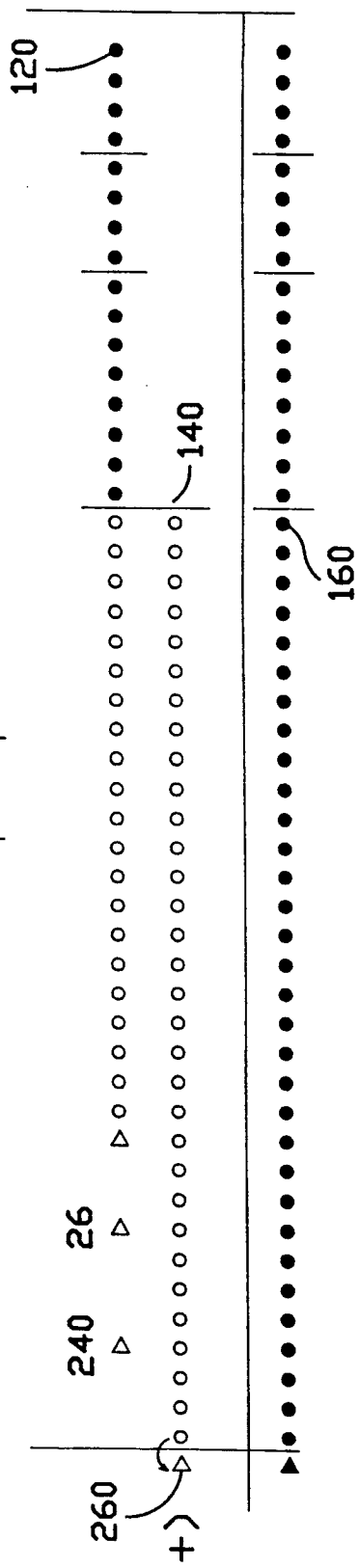

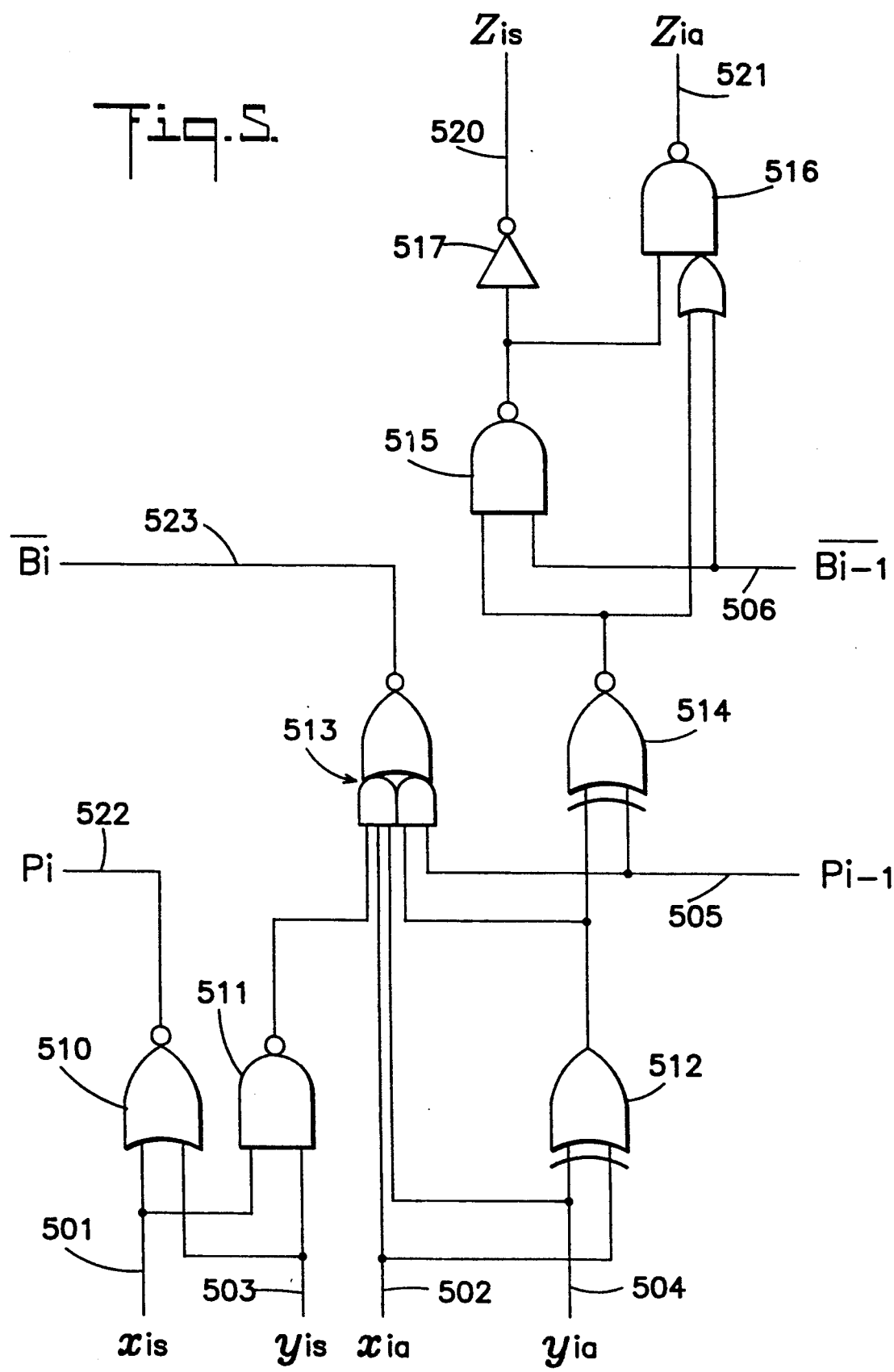

ARITHMETIC PROCESSOR USING SIGNED DIGIT REPRESENTATION OF INTERNAL OPERANDS

RELATED APPLICATIONS

This is a continuation of copending application Ser. No. 199,318 filed on May 26, 1988, now abandoned, which in turn is a continuation-in-part of the following pending patent applications:

| Serial No. | Filing Date | Title | U.S. Pat. No. |
|---|---|---|---|
| 066,817 | June 25, 1987 | ARITHMETIC PROCESSOR | 4,873,660 |
| 070,565 | July 7, 1987 | ARITHMETIC PROCESSOR AND ARITHMETIC UNIT THEREFOR | 4,878,192 |
| 074,892 | July 17, 1987 | HIGH SPEED ARITHMETIC PROCESSOR | 4,866,655 |
| 074,971 | July 17, 1987 | HIGH SPEED ARITHMETIC PROCESSOR AND MULTIPLIER THEREOF | 4,864,528 |
| 086,967 | August 18, 1987 | ARITHMETIC PROCESSOR AND ADDER CIRCUITRY THEREOF | 4,866,657 |
| 095,525 | September 10, 1987 | ARITHMETIC PROCESSOR | 4,868,777 |
| 136,365 | December 22, 1987 | ARITHMETIC PROCESSOR | 4,935,892 |

The disclosures of each application referred to above are incorporated herein by reference.

BACKGROUND OF THE INVENTION

This invention relates to an arithmetic processor, and more particularly, to a high-speed arithmetic processor having a regular cellular array structure which is suitable for and easily implemented into large scale integration (LSI) circuit devices and which incorporates means for performing high speed calculations by using a redundant signed-digit number representation when performing internal arithmetic operations.

Conventionally, an arithmetic processor which adds a plurality of numbers whose most significant digits are different in position from each other comprises an adder tree, for example, using a carry-retaining adder which simultaneously adds three digits and obtains two calculated results as output, the thus-obtained results being further added to a next higher order digit in a similar manner for the purpose of obtaining a final sum. In many applications, two numbers are required to be added in a manner whereby the digits of the first number are offset from the digits of the second number. A common example is the addition of partial sums formed during a multiplication calculation. The digits of the two offset numbers may be considered to generally comprise three portions: a lower order portion, in which the lower order digits of one of the offset numbers are not overlapped by digits of the other number, an intermediate portion, in which there are digits of both numbers present, and a higher order portion in which higher order digits of only one number are present. In the prior art, addition of the two numbers is performed by making the lower order portion part of the sum, per se. The digits of the intermediate portion are added by standard methods. In the higher order portion, when either digits of only the first or the second number is present, the addition is performed by first extending the sign for negative numbers (which are represented in 2's complement binary form). Sign extension is necessary because the carry from the intermediate digits has to be properly considered.

In the above described prior art, in a case where digits of either the first number or the second number are not present in the higher order portion, it is necessary for the higher order portion to be added by sign extension. Therefore, an adder for this portion is additionally needed. Furthermore, when addition is performed on a plurality of numbers which have their most significant digits offset with respect to each other, a problem arises in that the regularity of the circuit can be lost since the sum is extended by one digit due to the carry from the most significant digit whenever an addition is performed.

SUMMARY OF THE INVENTION

It is an object of this invention to solve the above described problem and to provide an arithmetic processor in which an adder thereof is configured by a regular circuit structure which can be readily fabricated on an LSI chip, has a small hardware volume, and is capable of performing high speed addition using a signed-digit number representation for the internal calculation.

Another object of the present invention is to provide an arithmetic processor in which an arithmetic unit thereof can be realized in a small hardware volume, and which can be readily fabricated on an LSI chip, by utilizing the characteristics of the signed-digit number representation to perform the internal arithmetic operations.

A still further object of the present invention is to provide an arithmetic processor with a small hardware volume within which a high speed multiplier and a divider are independently configured, by utilizing signed-digit number representations in the internal arithmetic operations.

The above objects are realized in accordance with one aspect of the invention by using a signed-digit number representation in the internal arithmetic operation, (described for example by Algirdas Avizienis in IRE Transactions on Electronic Computers, pp. 389-400, Sept. 1961) and forming an adder tree comprising adder cells having first means for adding the intermediate overlapping portions of two numbers where the digits of both the first number and the second number are present, second means for including directly into the sum the lower order portion in which the offset lower-order digits of either the first or the second number are present, and third means for outputting the carry created by the first means; the adder tree adding each pair of a plurality of numbers expressed by signed-digit numbers, and successively adding the thus-obtained partial sums to obtain the final sum. Furthermore, fourth means are provided for adding the carries which are created in each of the above described adder stages of the adder tree to the ensuing adder stage. In each adder stage of the above described adder tree, the first to the fourth means are executed to obtain the sum.

The objects of the invention are further achieved by using specific encoding representations which may differ in binary format in accordance with the digit, wherein the digits of the internal arithmetic numbers of the arithmetic processor are expressed by encoding a plurality of bits.

Still further, in accordance with the invention, a multiplier and divider are formed and integrated on the same chip.

BRIEF DESCRIPTION OF THE DRAWINGS

FIGS. 2 to 4 are drawings illustrating each step of the addition in the operation of the arithmetic shown in FIG. 1;

FIGS. 5 to 8 are schematic circuit diagrams illustrating an example of each redundant binary number adder cell for forming the arithmetic processor shown in FIG. 1.

DETAILED DESCRIPTION OF THE INVENTION

Figure 1:
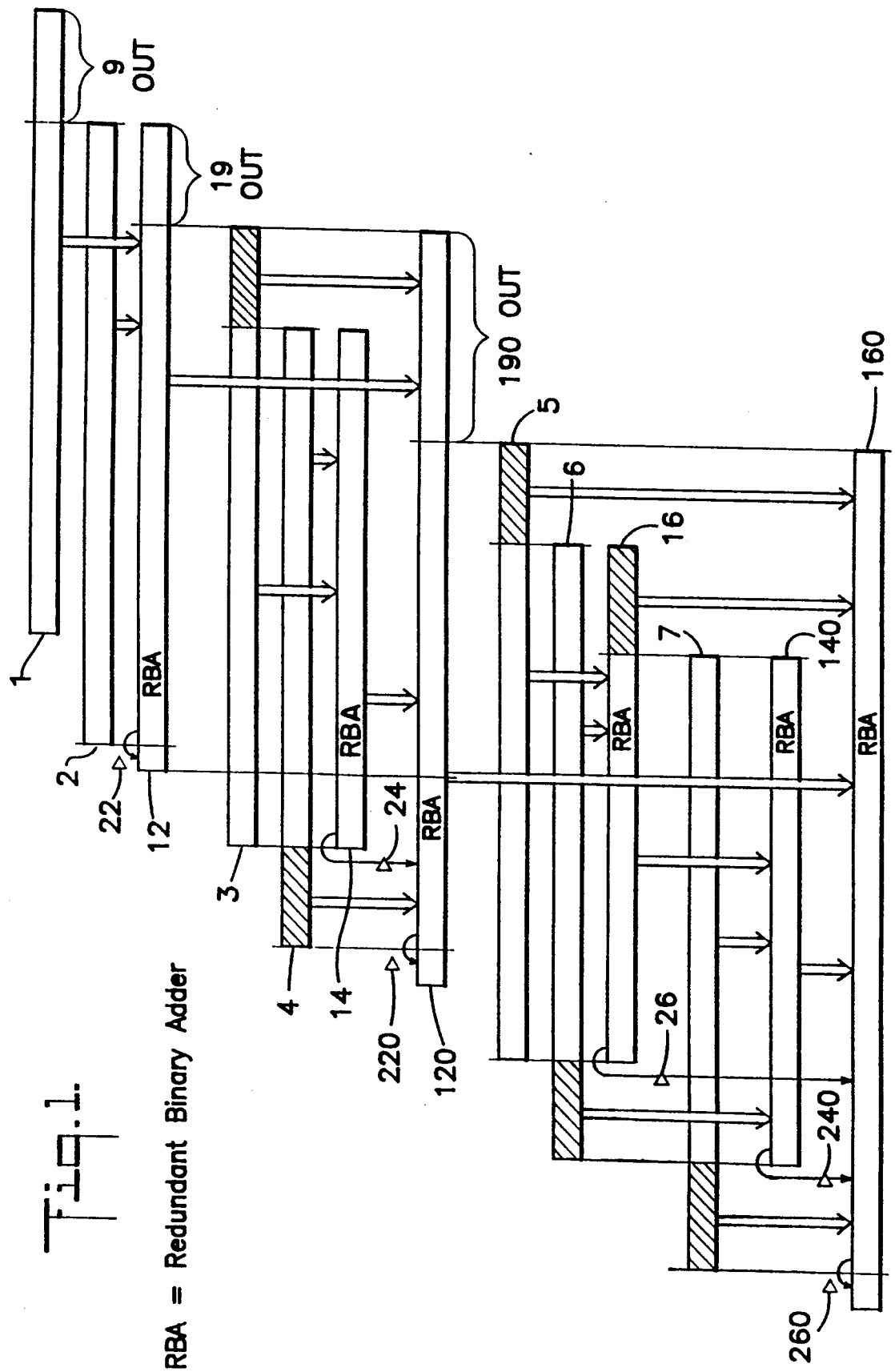
FIG. 1 illustrates the structure of an arithmetic processor according to an embodiment of this invention.

With reference to the drawings, an embodiment of the present invention will now be described.

First, a signed-digit number representation and adding rule thereof will now be described.

In a case where a signed-digit number is used for an internal arithmetic operation, each digit of the numbers to be calculated is expressed by one of a series of elements such as $\{-1, 0, 1\}$, $\{-2, -1, 0, 1, 2\}$, and $\{-N, \ldots, -1, 0, 1, \ldots N\}$, in radix 2, 3, and $N+1$ respectively. The representation is redundant because it is possible to express a number in a multiplicity of different forms. In addition there are a plurality of encoding formats that are capable of expressing each of the elements of the sets. For example, in radix 2, each digit of the set $\{-1, 0, 1\}$ can be expressed by encoding it in two bit binary signals, and can be expressed by using two suitable signals chosen from among a possible six signals $I_+$, $I_0$, $I_-$, $I_a$, $I_s$, $I_n$ shown in Table 1.

TABLE 1

| Signal For Representing Each Digit Of −1, −0, 1 | | | | | | |
|---|---|---|---|---|---|---|
| | Signal | | | | | |
| Digit | $I_+$ | $I_0$ | $I_-$ | $I_n$ | $I_a$ | $I_s$ |
| 1 | 1 | 0 | 0 | 0 | 1 | 1 |
| 0 | 0 | 1 | 0 | 1 | 0 | 1 |
| −1 | 0 | 0 | 1 | 1 | 1 | 0 |

In this encoding scheme, although $I_n$ is the logical negation of $I_+$, $I_a$ is the logical negation of $I_0$, and $I_s$ is the logical negation of $I_-$, they are treated as different signals for the purpose of defining a numerical logic.

Each digit $x_i$ of a redundant binary number to be added is represented by two single-bit binary values $x_{is}$ and $x_{ia}$ as shown, for example, in Table 2.

TABLE 2

| $x_i$ | $x_{is}$ | $x_{ia}$ |
|---|---|---|
| 1 | 0 | 1 |
| 0 | 0 | 0 |
| −1 | 1 | 1 |

An example of the rule for addition of the redundant binary numbers is shown in Table 3 in which $x_i$ and $y_i$ are respectively an augend and an addend, $c_i$ and $s_i$ are respectively a carry and an internal sum, and $p_i$ is derived from the sign of $x_i$ and $y_i$. If both are non-negative, $p_i=1$; if at least one of them is negative, $p_i=0$. The carry $c_i$ and the internal sum $s_i$ are determined to satisfy the arithmetic sum $$x_i + y_i = 2c_i + s_i \tag{1}$$

of the redundant binary number in accordance with the signs $p_{i-1}$ of the two digits which are in the next lower order position of the two numbers. By utilizing this method, the carry propagation is limited to at most one digit, so that parallel addition of the digits can be conducted in a predetermined time period regardless of the number of digits. In this scheme, when parameters $B_i$ and $R_i$ are introduced, and determined in accordance with the arithmetic sum of the redundant binary numbers as follows, $$B_i = c_i + \overline{p_i} \tag{2}$$

$$R_i = s_i + p_{i-1} \tag{3}$$

$c_i$ and $s_i$ can be converted to a binary signal $\{1,0\}$, whereby the amount of hardware volume required for a calculation can be reduced. In this state, $\overline{p_i}$ represents a signal which is the logical negation of $p_i$.

TABLE 3

| $x_i$ | $y_i$ | $x_i + y_i$ | $p_i$ | $p_{i-1}$ | $c_i$ | $s_i$ | $B_i = c_i + \overline{p_i}$ | $R_i = s_i + p_{i-1}$ |
|---|---|---|---|---|---|---|---|---|
| 1 | 1 | 2 | 1 | $\frac{1}{0}$ | 1 | 0 | 1 | $\frac{1}{0}$ |
| 1 | 0 | 1 | 1 | $\frac{1}{0}$ | $\frac{1}{0}$ | $\frac{-1}{1}$ | $\frac{1}{0}$ | $\frac{0}{1}$ |
| 0 | 1 | | | | | | | |

TABLE 3-continued

| $x_i$ | $y_i$ | $x_i + y_i$ | $p_i$ | $p_{i-1}$ | $c_i$ | $s_i$ | $B_i = c_i + p_i$ | $R_i = s_i + p_{i-1}$ |
|---|---|---|---|---|---|---|---|---|
| 0 | 0 | 0 | 1 | 1 | 0 | 0 | 0 | 1 |
| 1 | −1 |   | 0 | 0 |   |   | 1 | 0 |
| −1 | 1 |   |   |   |   | 1 |   |   |
| −1 | 0 | −1 | 0 | 1 | 0 | −1 | 1 | 0 |
| 0 | −1 |   |   | 0 | −1 | 1 | 0 | 1 |
| −1 | −1 | −2 | 0 | 1 | −1 | 0 | 0 | 1 |
|   |   |   |   | 0 |   |   |   | 0 |

$R_i$, $B_i$ and $p_i$ are, in accordance with the rule for addition shown in Table 3, represented by the following logical equation using binary signals $x_{is}$, $x_{ia}$, $y_{is}$ and $y_{ia}$ which respectively represent augend $x_i$ and addend $y_i$.

$$p_i = \overline{x_{is} + y_{is}} \quad (4)$$

$$\begin{aligned} B_i &= x_{ia} \cdot y_{ia} \cdot \overline{x_{is} \cdot y_{is}} + (x_{ia} \cdot \overline{y_{ia}} + \overline{x_{ia}} \cdot y_{ia}) \cdot p_{i-1} \\ &= x_{ia} \cdot y_{ia} \cdot \overline{x_{is} \cdot y_{is}} + (x_{ia} \oplus y_{ia}) \cdot p_{i-1} \end{aligned} \quad (5)$$

$$\begin{aligned} R_i &= (x_{ia} \oplus y_{ia}) \cdot \overline{p_{i-1}} + \overline{(x_{ia} \oplus y_{ia})} \cdot p_{i-1} \\ &= x_{ia} \oplus y_{ia} \oplus p_{i-1} \end{aligned} \quad (6)$$

In the logical equation, · is a logical product (AND), + is a logical sum (OR), $\overline{x}$ is a logical negation of $x$, and $\oplus$ is a logical operand showing an exclusive logical sum (EX-OR). The sum $z_i$ of the first digits is obtained by an arithmetic equation, $$z_i = s_i + c_{i-1} \quad (7)$$

from the internal sum $s_i$ and the carry $c_{i-1}$ from the digit which is in the next lower order position. By rewriting this arithmetic equation using $B_i$ and $R_i$, $$\begin{aligned} z_i &= s_i + c_{i-1} \\ &= (R_i - p_{i-1}) + (B_{i-1} - \overline{p_{i-1}}) \\ &= R_i + B_{i-1} - p_{i-1} - (1 - p_{i-1}) \\ &= R_i + B_{i-1} - 1 \end{aligned} \quad (8)$$

can be obtained. Furthermore, from the logical rule shown in Table 4, logical equations for the sum $z_i$ can be obtained:

$$z_{is} = \overline{R_i + B_{i-1}} \quad (9)$$

$$z_{ia} = R_i \oplus B_{i-1} \quad (10)$$

TABLE 4

| $R_i$ | $B_{i-1}$ | $z_i$ | $z_{is}$ | $z_{ia}$ |
|---|---|---|---|---|
| 0 | 0 | −1 | 1 | 1 |
| 0 | 1 | 0 | 0 | 0 |
| 1 | 0 | 0 | 0 | 0 |
| 1 | 1 | 1 | 0 | 1 |

Next, specific embodiments of the invention will be described.

In the first embodiment, an adding unit will be described which is a member of a multiplier, utilizing a redundant binary representation for its internal arithmetic operation, and which adds seven partial products each of which is offset with respect to the others by two digits.

FIG. 1 is a structural diagram of an adding unit to which an embodiment of the present invention is applied. In this embodiment, the above described rule for addition is used. In the addition of two numbers, the number whose most significant digit is located at a lower order position is called an augend, while the number whose most significant digit is positioned at the higher order position is called an addend.

Redundant binary output buffers 1, 2, 3, 4, 5, 6, and 7 are circuits for outputting or retaining the redundant binary numbers; these buffers may be formed by a register or a redundant binary adder.

Each of redundant binary adders 12, 14 and 16 is a circuit for adding the outputs from the redundant binary buffers 1 and 2, 3 and 4, and 5 and 6 in a redundant binary number system in accordance with the rule for addition shown in Table 3.

Carries 22, 24 and 26 are the carries which result from additions conducted by the redundant binary adders 12, 14, and 16. The carry 22 is included in the output of the redundant binary adder 12.

Redundant binary adders 120 and 140 are circuits for adding the outputs from the redundant adders 12 and 14 and the carry 24, and the outputs from the redundant binary adder 16 and the redundant binary buffer 7, respectively, the addition being conducted in accordance with the rule for addition shown in Table 3.

Carries 220 and 240 are the carries resulting from the addition conducted by the redundant binary adders 120 and 140. The carry 220 is included in the output of the redundant binary adder 120.

A redundant binary adder 160 is a circuit for adding the outputs from the redundant binary adders 120 and 140 and the carries 26 and 240 in a redundant binary number system in accordance with the rule for addition shown in Table 3.

A carry 260 is the carry resulted from the addition conducted by the redundant binary adder 160, and is included in the output of the redundant binary adder 160.

Outputs 9, 19, and 190 are respectively the portions of the digits which are output as is without being passed through the adders when an addition is conducted by the redundant binary adders 12, 120 and 160.

The details of this adding unit will now be described with reference to the model drawings shown in FIGS. 2 to 4. The binary numbers in these drawings are the same as the outputs from the redundant binary buffers, outputs from the redundant binary adders, and the carries, and are given the same reference numerals as shown in FIG. 1.

Figure 2:
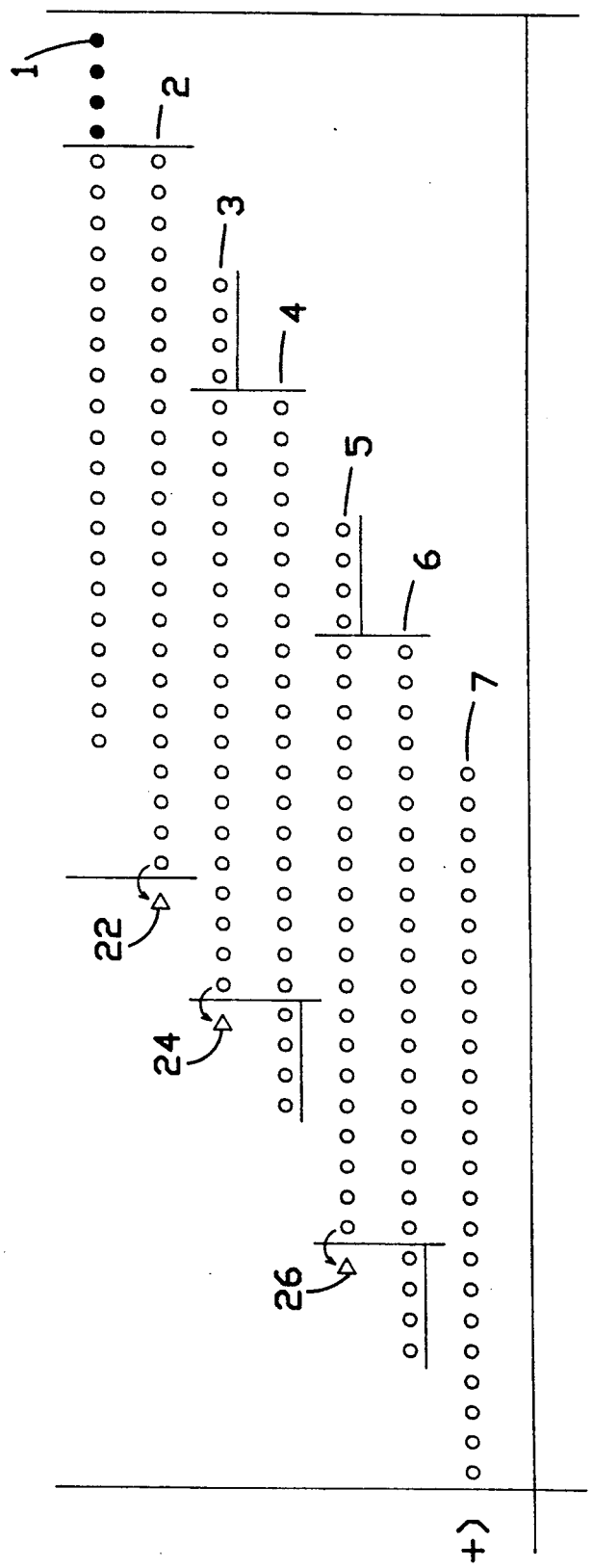

In FIG. 2, a first step of the addition is shown. The intermediate portion between the vertical lines represents the region for simultaneously adding two numbers of the redundant binary numbers in a redundant binary system. The number whose most significant digit is positioned at a lower order position is added by first entering 0's to the left of its most significant digit. In the example shown in FIG. 2 since the number whose most significant digit is positioned at a lower order position is the redundant binary number 1, the addition for obtaining the sum 12 of the redundant binary number 1 and 2 is conducted by entering 0's to the left of the most significant digit of the augend. The reason for this lies in the fact that if only the portion in which both digits are present are added by the above described first means, and a carry retained by the above-described third means, four numbers including the carry would need to be added in the ensuing additions to complete the sum. This would not be efficient. The carry 22 resulting from the addition, is located at the most significant digit of the sum 12, and is output by the third means. Since the portions shown by black dots need not be added later, they are per se discharged as an output to be made part of the final sum.

In obtaining the sums 14 and 16, which are respectively the sum of redundant binary numbers 3 and 4, and 5 and 6, the additions for the intermediate digits where both the augend and addend digits are present are conducted by the above-described first means. In the higher order portions where the augend digits in the underlined section are not present, the addends are per se made the sum by the second means of entering 0's to the left of the highest order digit and then performing an addition. The carries 24 and 26 produced by the addition of the intermediate digits are added by the above described fourth means after they have been output. The lower order digits designated by the underlined sections are also per se made part of the final sum.

FIG. 3 shows a next step. In these redundant binary numbers, since the number whose most significant digit is at the lowest order position is 12, the addition of 12 and 14 and carry 24 resulting from the addition for obtaining 14 are conducted by the above described first means by entering 0's to the upper digits, and by the above-described fourth means in which the carries are added. The resultant sum 120 and the carry which is located at the most significant digit and output by the third means is 220. The portions designated by black dots are per se delivered as outputs to form part of the final sum. The addition of 16 and the residual number 7 in the previous step are conducted by the above-described first, second, third and fourth means. Reference numeral 140 represents a resultant sum, reference numeral 240 represents a carry created from this addition. The portions designated by underlined sections are the portions which are per se made the sum from the upper digits and lower digits.

FIG. 4 shows the final step. Since the number which has its most significant digit located at the lowest order position is 120, a sum 160 is obtained from 120, 140 and carries 26 and 240 by the above described first and fourth means. Reference numeral 260 is a carry which is located at the highest order position of the sum, and output by the third means.

Since the redundant binary adder which is used in these additions adds the carries by the fourth means in the next and ensuing stages, the sum does not extend by one digit whenever an addition is conducted as shown in FIG. 1, and a regular circuit can be constituted.

Circuits forming each block shown in FIG. 1 will now be described.

FIG. 5 is an example of a schematic circuit diagram obtained from equations (4), (5), (6), (9), (10), and shows an adder cell forming the parts of the redundant binary adders 12, 120, and 160 and 14. 16, and 160 shown in FIG. 1. Signals $x_{is}$ 501 and $x_{ia}$ 502 are two single bit binary signals representing the i-th digit $x_i$ of the augend redundant binary number, $y_{is}$ 503 and $y_{ia}$ 504 are two bit single-binary signals representing the i-th digit of the addend redundant binary number, and $p_{i-1}$ 505 is a signal representing whether both the augend $x_{i-1}$ and the addend $y_{i-1}$ at the (i−1)th digit position are non-negative. $\overline{B}_{i-1}$ is a signal which is the logical negation of the arithmetic sum $B_{i-1}$ of the carry $c_{i-1}$ which is created by the addition of the (i−1)th digit and the negation $P_{i-1}$ of the above described $p_{i-1}$ 505. $z_{is}$ 520 and $z_{ia}$ 521 are two bit signals each of which shows the output $z_i$ of the result of the (i)th digit. $p_i$ 522 is a signal representing whether both the augend $x_i$ and the addend $y_i$ are non negative. $\overline{B}_i$ 523 is a signal which negates the arithmetic sum $B_i$ of the carry $c_i$ created from the addition of the i-th digit and the logical negation $\overline{p}_i$ of the above-described $p_i$ 522. A two-input-NOR gate 510, two input-NAND gates 511, 515, two-input exclusive OR gate 512, three input and two-input AND-NOR complex gate 513, two-input exclusive NOR gate 514, two-input and one-input OR-NAND complex gate 516, and inverter 517 are logical gates forming the adder cell shown in FIG. 5.

Next, a circuit will be described for adding a redundant binary number and 0, in each stage of an adder tree, for the case where a number whose most significant digit is located at a lower order position is to be added to an adjacent number having its most significant digit at a higher order position. In the above-described equations (1) to (10). assuming that the augend $x_i=0$, that is, $x_{is}=x_{ia}=0$, the logical equations in this case are reduced to the following:

$$p_i = \overline{y_{is}} \tag{11}$$

$$B_i = y_{ia} \cdot p_{i-1} \tag{12}$$

$$\begin{aligned} R_i &= y_{ia} \cdot \overline{p_{i-1}} + \overline{y_{ia}} \cdot p_{i-1} \\ &= y_{ia} \oplus p_{i-1} \end{aligned} \tag{13}$$

Figure 6:
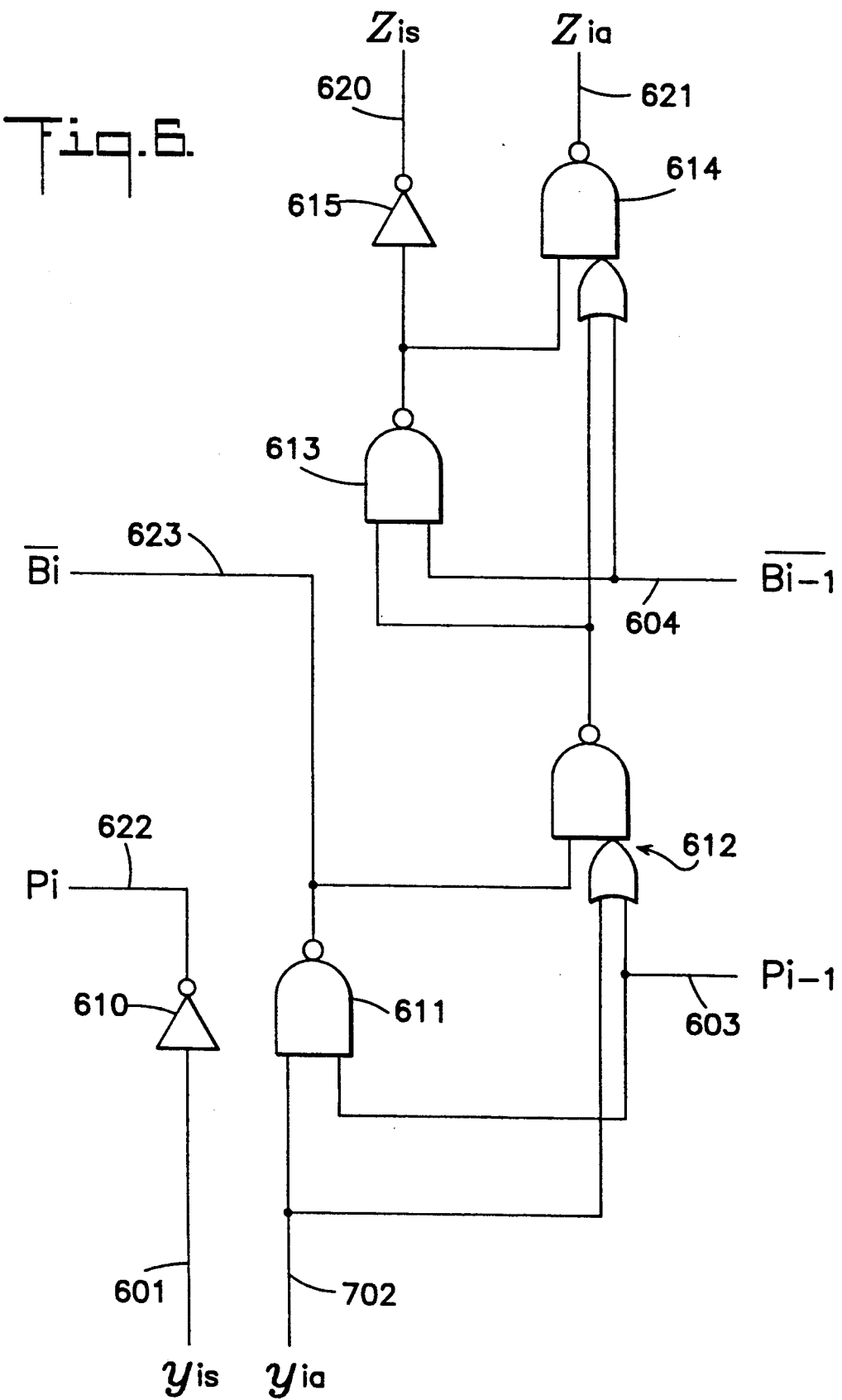

FIG. 6 shows a schematic example of a circuit of an adder cell forming the parts of the redundant binary adders 12, 120, and 160 shown in FIG. 1, and obtained from the logical equations (9) to (13). Signals $y_{is}$ 601 and $y_{ia}$ 602 are two bit signals each represents the (i)th digit of the addend redundant binary number. $p_{i-1}$ 603 is a signal showing whether the augend $y_{i-1}$ is non-negative in a case where the augend $x_{i-1}$ or the addend $y_{i-1}$ or $x_{i-1}$ is 0. $\overline{B}_{i-1}$ 604 is a signal which is the logical negation of the arithmetic sum $B_i$1 of the carry $c_{i-1}$ caused from the addition of the (i−1)th digit and the logical negation $p_{i-1}$ of the above-described $p_{i-1}$ 603. $z_{is}$ 620 and $z_{is}$ 621 are two-bit signals showing the output $z_i$ as a result of the addition of the (i)th digit. $p_i$ 622 is a signal showing whether $y_i$ is non negative. $\overline{B}_i$ 623 is a signal which is a logical negation of the arithmetic sum $B_i$ of the carry $c_i$ caused from the addition of the i-th digit and the logical negation $\overline{p}_i$ of 622. Inverters 610, 615, two input NAND gates 611 and 613, and two input and 1-input OR-NAND-gates 612 and 614 are the logical gates forming the adder cell shown in FIG. 6.

Next, a circuit will be described which is used in the most significant digit of the redundant binary adder which adds the number whose most significant digit is positioned at the lower order position and the adjacent number whose most significant digit is at higher order position, and which makes the carry from the adjacent digit which is in the next lower order position the sum per se.

In the above-described logical equations (1) to (10), assuming that $x_i = y_i = 0$, that is $x_{ia} = x_{is} = y_{ia} = y_{is} = 0$, the following equation can be obtained:

$$z_{is} = p_{i-1} + B_{i-1} \quad (14)$$

$$z_{ia} = p_{i-1} \oplus B_{i-1} \quad (15)$$

Figure 7:
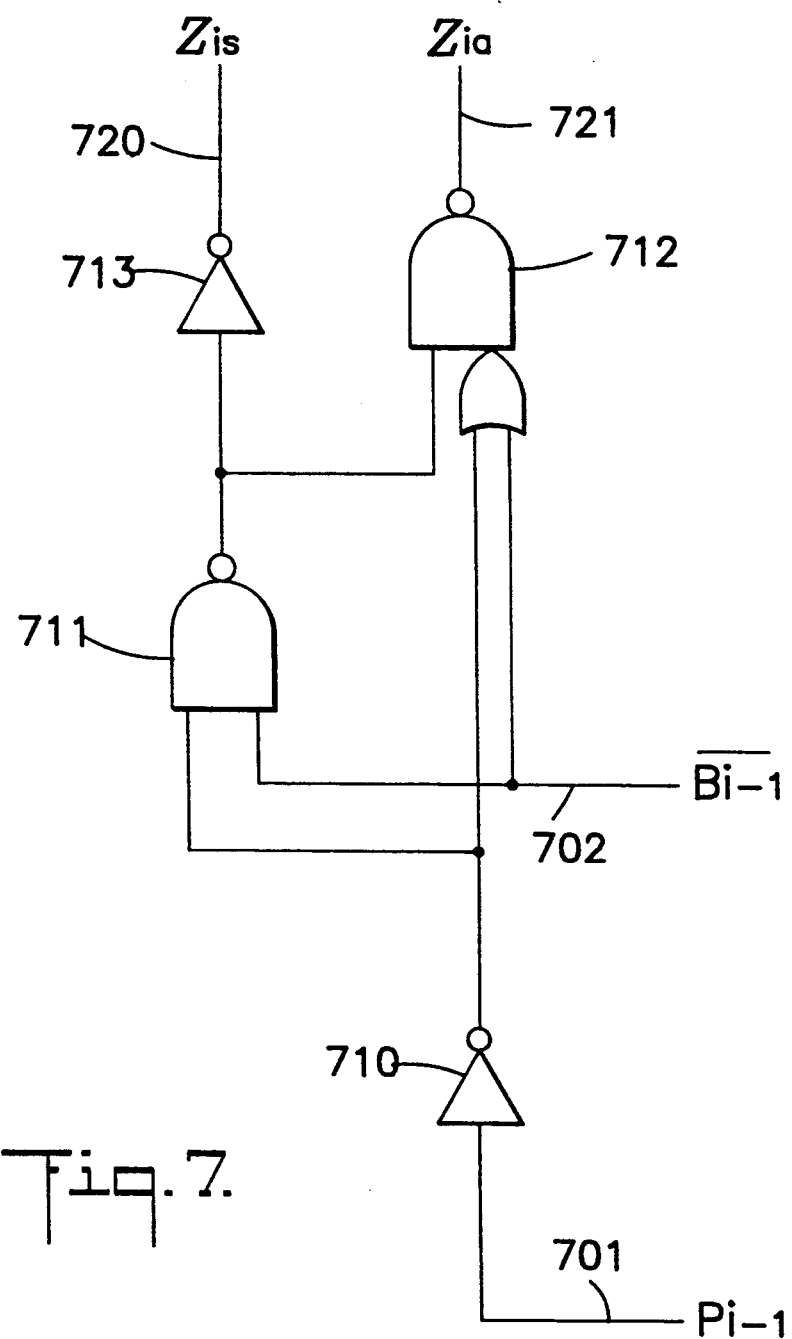

FIG. 7 is an example of a schematic circuit diagram showing an adder cell in which the carries 22, 220, and 260 are per se made the sum in the redundant binary adders 12, 120, and 160 shown in FIG. 1. $p_{i-1}$ 701 is a signal representing the sign of the addend $y_{i-1}$ at the (i−1)th digit (one digit lower). $\overline{B}_{i-1}$ 702 is a signal which logically negates the arithmetic sum $B_{i-1}$ of the carry $c_{i-1}$ and the logical negation $\overline{p}_{i-1}$ of the above-described $p_{i-1}$ 701. $z_{is}$ 720 and $z_{ia}$ 721 are two-bit signals showing the output $z_i$ of the result of the addition of the i-th digit. Inverters 710 and 713, two-input-NAND gate 711, and two-input and one-input-OR-NAND combined gate 712 are the logical gates forming this adder cell.

Next, a circuit used for the lowest order digit of each redundant binary adder will now be described. In this lowest order digit, any carry from an even lower order digit of the adder need not be considered. Therefore, assuming that $p_{i-1} = B_{i-1} = 0$, the following equations can be obtained from the logical equations (4), (5), and (6).

$$p_i = x_{is} + y_{is} \quad (16)$$

$$B_i = x_{ia} \cdot y_{ia} \cdot x_{is} \cdot y_{is} \quad (17)$$

$$R_i = x_{ia} \oplus y_{ia} \quad (18)$$

Furthermore, from equations (9) and (10), the sum $z_i$ is obtained as:

$$z_{is} = 0 \quad (19)$$

$$z_{ia} = R_i \quad (20)$$

Figure 8:
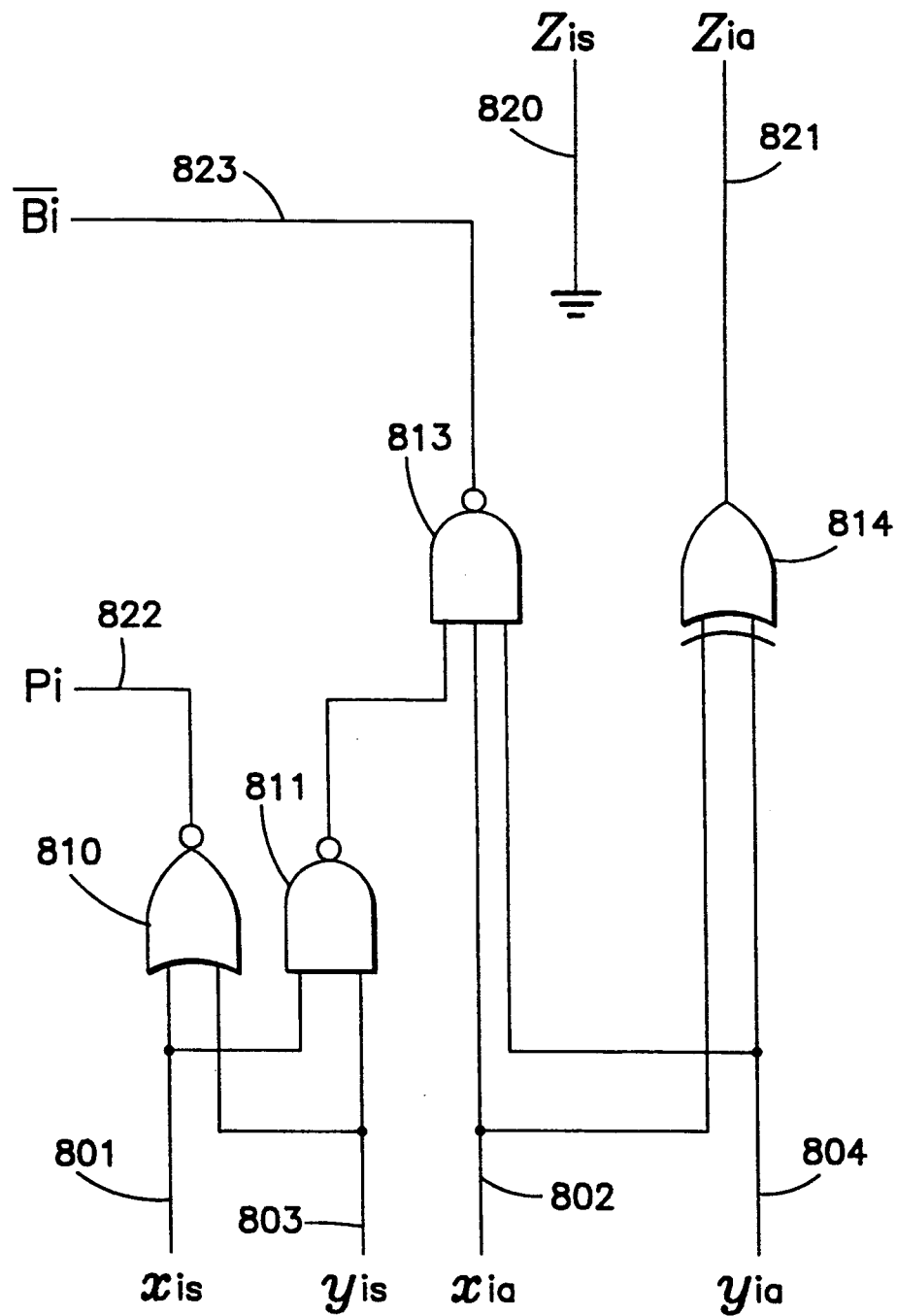

FIG. 8 is an example of a schematic circuit diagram showing an adder cell forming parts of the redundant binary adders 12, 14, 16, 120, 140, and 160 shown in FIG. 1.

Signals $x_{is}$ 801 and $x_{ia}$ 802 are two single-bit binary signals which represent the i-th digit $x_i$ which is the lowest order digit of the augend redundant binary number. $y_{is}$ 803 and $y_{ia}$ 804 are two single-bit binary signals which represent the (i)th digit $y_i$ of the addend redundant binary number. $z_{is}$ 820 and $z_{ia}$ 821 are two-bit signals showing the output $z_i$ which is the result of the addition of the two digits. $p_i$ 822 is a signal showing whether both the augend $x_i$ and addend $y_i$ are non-negative. $\overline{B}_i$ 823 is a signal which logically negates the arithmetic sum $B_i$ of the carry $c_i$ which is created from the addition of the lowest order digits and the logical negation $\overline{p}_i$ of the above described $p_i$ 822. Two input NOR gate 810, two input NAND gate 811, three input NAND gate 813, and two-input exclusive-OR gate 814 are logical gates forming the adder cell shown in FIG. 8.

Figure 9:
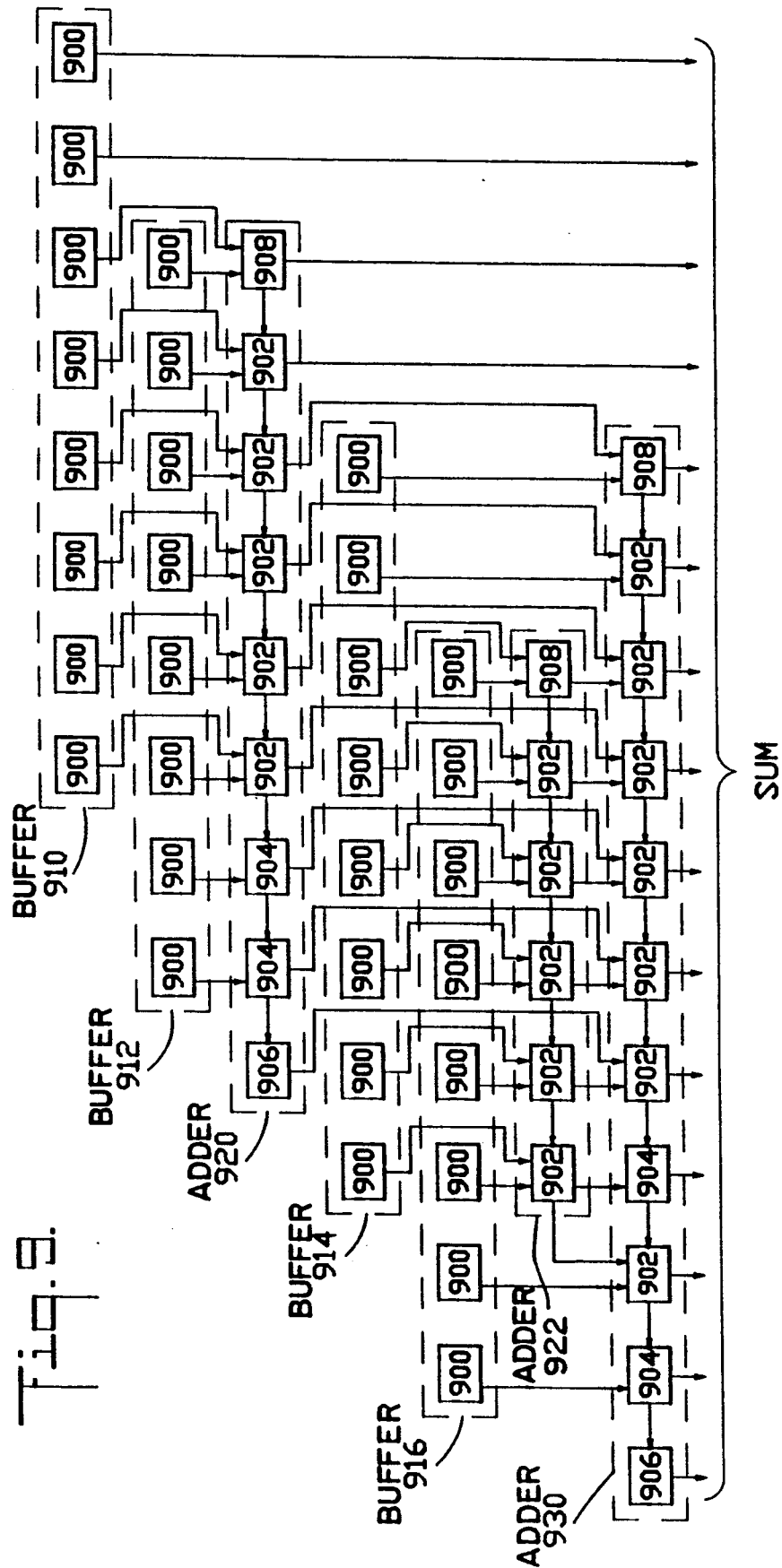
FIG. 9 is a schematic circuit diagram showing the arithmetic processor actually formed by each of the redundant binary adder cells shown in FIGS. 5-8 for adding four redundant binary numbers.

Finally, an example of a circuit for an adder unit which embodies an arithmetic processor according to an object of this invention, and which makes use of the adder cell configurations shown in FIG. 5, 6, 7 and 8 is shown in FIG. 9. In this example, an adder circuit is shown for adding four redundant binary numbers which are offset by two digits with respect to each other.

Redundant binary number output cell 900 is a cell which forms part of the redundant binary output buffers 910, 912, 914, and 916, and outputs the redundant binary numbers as a two bit binary signal. It can be realized by a flip flop, latch, and redundant binary buffer. A redundant binary adder cell 902 is an adder cell of the type shown in FIG. 5, which adds two redundant binary numbers and the carry from the lower order digit, outputs the redundant binary number which is the result of the addition as a two bit binary signal, and outputs the above-described binary signal $p_i$ and $Bi$ to a redundant binary adder cell which is one digit higher in order.

A redundant binary adder cell 904 is an adder cell of the type shown in FIG. 6, which adds a redundant binary number and 0 and the carry of the lower digit, and which outputs the redundant binary number which is the result of the addition as a two bit binary signal, and outputs the above-described binary signal $p_i$ and $B_i$ to the redundant binary adder cell which is one digit higher in order.

A redundant binary adder cell 906 is an adder cell of the type shown in FIG. 7, which makes the carry from the next lower order digit per se the sum, and outputs its redundant binary number as a two-bit binary signal. A redundant binary adder cell 908 is an adder cell shown in FIG. 8, which adds two redundant binary numbers and outputs the redundant binary number which is the result of the addition (as a two-bit binary signal) and above described binary signals $p_i$ and $B_i$ to the redundant binary adder cell which is one digit higher in order.

A redundant binary adder 920 is formed by the redundant binary adder cells 902, 904, 906 and 908, and adds outputs from the redundant binary buffers 910 and 912 to obtain a partial sum. The lower two digits of the outputs from the redundant binary buffers 910 and 920 are per se output, and become parts of the final sum. A redundant binary adder 922 is formed by redundant binary adder cells 902 and 908, and adds the outputs from the redundant binary buffers 914 and 916 to obtain a second partial sum. A redundant binary adder 922 is formed by redundant binary adder cells 902 and 908, and adds the outputs from the redundant binary buffers 914 and 916. A redundant binary adder 930 is formed by redundant binary adder cells 902, 904, 906, 908, and adds the outputs of the upper two bits of the redundant buffers 916 and the outputs of redundant binary buffers 920 and 922. The output from the redundant binary buffer 930 and the outputs of the two lower order digits of the above-described redundant binary buffer 910 and the redundant binary adder 920 are the sum of the four redundant binary numbers of eight digits, each of which is shifted two digits with respect to its adjacent number. The output of each digit is represented by a two-bit binary signal.

According to this embodiment, the additions are formed in a two-branch manner and are mainly conducted in the portion where both the augend and addend are present, with the resultant carries being either retained or output and added in the ensuing additions. As a result, the number of adder cells can be reduced in comparison to that required in the conventional art, high-speed operation can be realized, and a regular circuit architecture can be constituted.

Since the number of adder cells can be reduced by the above described operations, the hardware volume can be decreased, the arithmetic processor can be operated at high speed, the circuits can be regularly constituted, and the arithmetic processor can be easily and economically realized by means of large scale integration (LSI). The above defined embodiment is therefore of great practical value.

Next, an embodiment of the present invention which relates to an optimized encoding representation of signed-digit numbers will now be described. In the first embodiment, only one particular binary format is used to encode each digit of a redundant binary number. However, alternate binary format, such as shown in Table 5, may be used to optimize the encoding logic.

TABLE 5

| Different Formats for Logical Representation Of {−1, 0, 1} | | | | | | | | |
|---|---|---|---|---|---|---|---|---|
| $1_+$ | $1_-$ | | $1_a$ | $1_s$ | | $1_o$ | $1_n$ | |
| 1 | 1 | 0 | 1 | 1 | 1 | 1 | 0 | 0 |
| 0 | 0 | 0 | 0 | 0 | 1 | 0 | 1 | 1 |
| −1 | 0 | 1 | −1 | 1 | 0 | −1 | 0 | 1 |

By suitably selecting from the above plurality of binary formats for the digits of redundant binary members, a format which is chosen in accordance with the calculation requirements of a particular digit, the volume of the hardware can be significantly reduced and the arithmetic processing can be conducted at high speed. Specifically, this embodiment will describe a case in which a shift subtracting divider is used to perform divisions of n digit normalized signless binary decimals utilizing a redundant binary representation for the internal arithmetic operation, and wherein a different encoding representation is used for the three higher order digits than for the fourth and following digits of the partial remainder which is used to determine a digit of the quotient.

The shift subtracting division method is generally represented by the following recursion formula.

$$R^{(j-1)} = r \times R^{(j)} - q_j \times D \text{ for } j = 0, 1, \ldots, n-1 \quad (21)$$

In this equation, j represents an index of the recursion formula, r represents a radix, D represents a divisor, $q_j$ represents the j-th quotient digit below the decimal point, $r \times R^{(j)}$ represents a partial dividend before determination of $q_j$, and $R^{(j+1)}$ represents a partial remainder after determination of $q_j$. Therefore, a cell for determining the quotient $q_j$ for each index of the recursion formula and a cell for determining each digit of the partial remainder $R^{(j+1)}$ are necessary to realize the requisite complex circuit.

Figure 10:
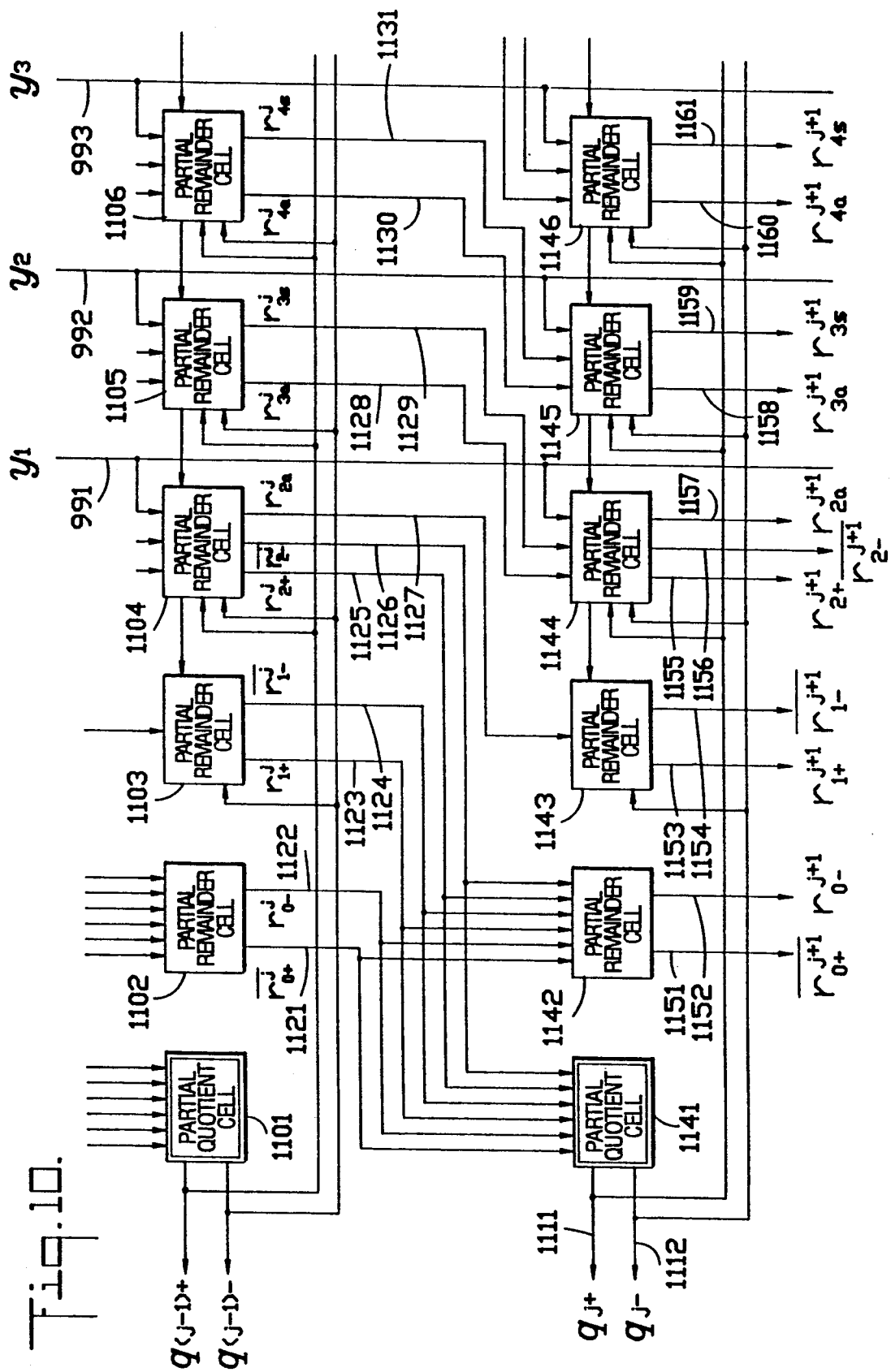
FIG. 10 is a block diagram illustrating another embodiment of the invention for carrying out division.

FIG. 10 is a block diagram illustrating the structure of a device according to an embodiment of the present invention. Blocks and 1141 are partial quotient determining cells, blocks 1102 to 1106, and 1142 to 1146 are partial remainder determining cells. Signals $y_1$ 991, $y_2$ 992, and $y_3$ 993 are respectively the first, second and third decimal points of the divisor D which has been formalized as $0.y_1y_2y_3, \ldots, y_n$. Signals $\bar{q}_{j+}$ 1111 and $\bar{q}_{j-}$ 1112 are negation signals of the two-bit signals $q_{j+}$ and $q_{j-}$ showing the quotient $q_j$ of the j-th decimal point. Signals $r_{0+}{}^j$ 1121 and $r_{0-j}$ 1122 are the signal and the logical negation signal, respectively, representing the uppermost digit of the partial remainder R(j), $r_{1+}{}^j$ 1123 and $r_{1-}{}^j$ 1124 are the same for the second digit, $r_{2+}{}^j$ 1125, $r_{2-}{}^j$ 1126, and $r_{2a}{}^j$ 1227 are the same for third digit. $r_{3a}{}^j$ 1128 and $r_{3s}{}^j$ 1129 are the same for the fourth digit, $r_{4a}{}^j$ 1130 and $r_{4s}{}^j$ 1131 are the same for the fifth digit. Signals $r_{0+}{}^{j+1}$ 1151, $r_{0-}{}^{j+1}$ 1152, $r_{1+}{}^{j+1}$ 1153, $r_{1-}{}^{j+1}$ 1154, $r_{2+}{}^{j+1}$ 1155, $r_{2-}{}^{j+1}$ 1156, $r_{2a}{}^{j+1}$ 1157, $r_{3a}{}^{j+1}$ 1158, $r_{3s}{}^{j+1}$ 1159, $r_{4a}{}^{j+1}$ 1160, and $r_{4s}{}^{j+1}$ 1161 are, in a similar manner to the signals 1121 to 1131, signals representing the five higher its of the partial remainder $R^{(j+1)}$. The encoding format of the above described signals are shown in Table 6.

TABLE 6

| Logical Representation Of Different Formats For Signals q and r | | | | | | | |
|---|---|---|---|---|---|---|---|
| q | q+ | q− | r | r+ | r− | $r_a$ | $r_s$ |
| 1 | 1 | 0 | 1 | 1 | 0 | 1 | 1 |
| 0 | 0 | 0 | 0 | 0 | 0 | 0 | 1 |
| −1 | 0 | 1 | −1 | 0 | 1 | 1 | 0 |

In this embodiment, since the radix r=2, equation (21) becomes $$R^{(j+1)} = 2 \times R^{(j)} - q_j \times D \quad (22)$$

Therefore, the quotient is determined to satisfy the following condition:

$$|R^{(j+1)}| < D \quad (23)$$

From this condition, the quotient $q_j$ is, in accordance with the value of the three most significant digits $[r_0{}^j \cdot r_1{}^j r_2{}^j]_{SD2}$ of the partial remainder $R^{(j)}$, determined as follows:

$$q_j = \begin{cases} 1, & \text{when } [r_0 \cdot r_1 r_2]_{SD2} > 0 \\ 0, & \text{when } [r_0 \cdot r_1 r_2]_{SD2} = 0 \\ -1, & \text{when } [r_0 \cdot r_1 r_2]_{SD2} < 0 \end{cases} \quad (24)$$

Where [ ]$_{SD2}$ shows the signed digit redundant binary representation in radix 2. Using the two-bit signals $q_{j+}$ and $q_{j-}$ to represent each element of {−1, 0, 1}, the following logical equations can be easily determined.

$$q_{j+} = r_{0+}{}^j + r_{0-}{}^j \cdot (r_{1+}{}^j + r_{1-}{}^j r_{2+}{}^j) \quad (25)$$

$$q_{j-} = r_{0-}{}^j + r_{0+}{}^j \cdot (r_{1-}{}^j + r_{1+}{}^j r_{2-}{}^j) \quad (26)$$

Figure 11:
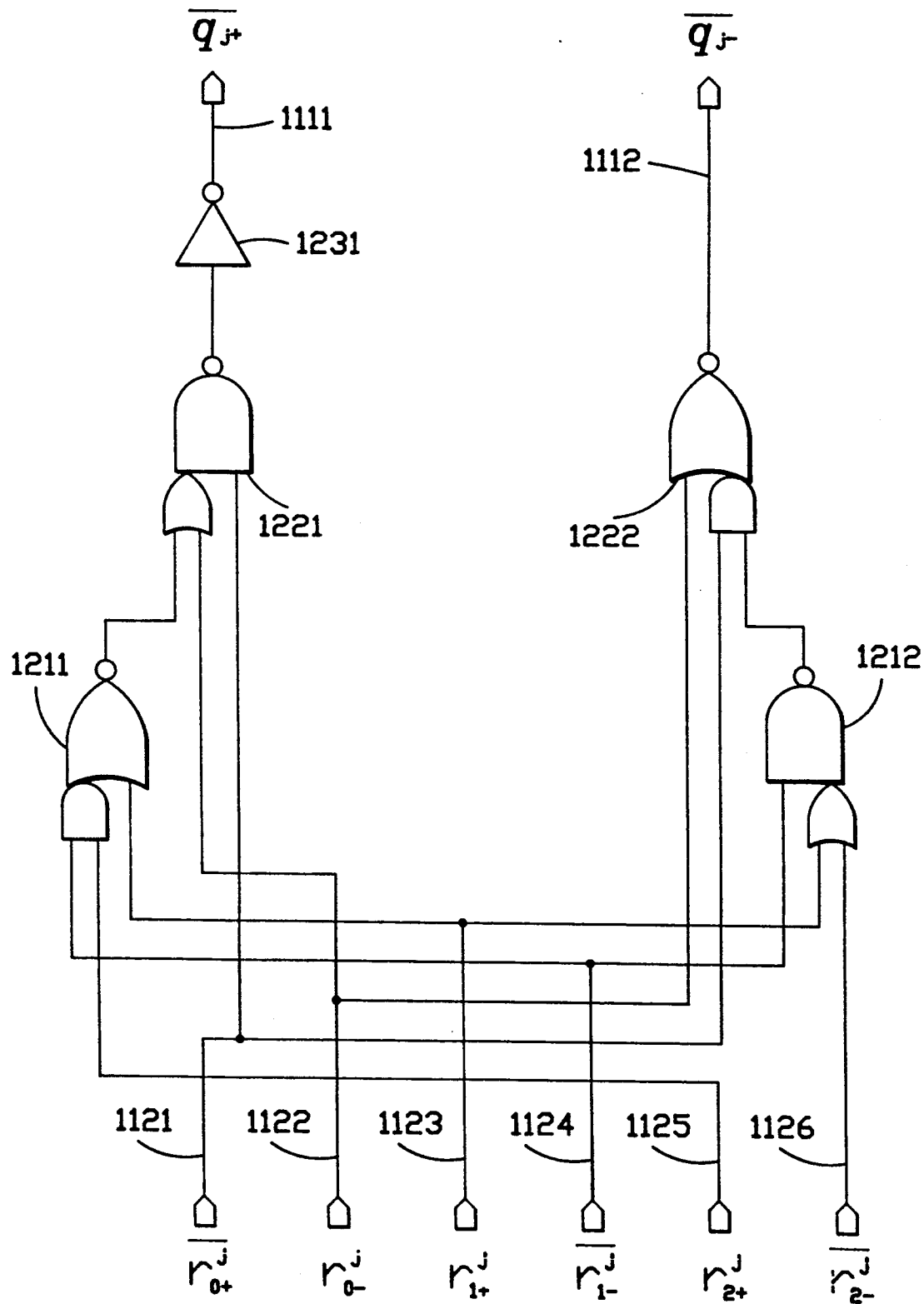
FIG. 11 is a circuit diagram showing a partial quotient determining cell used in the divider shown in FIG. 10.

In the above-described equations, · represents a logical product (AND), + represents a logical sum (OR), $\overline{r_{0+}{}^j}$, $\overline{r_{0-}{}^j}$, $\overline{r_{1+}{}^j}$, and $\overline{r_{1-}{}^j}$, each represents a logical negation of $r_{0+}{}^j$, $r_{0-}{}^j$, $r_{1+}{}^j$, $r_{1-}{}^j$. Furthermore, although $r_{0-}{}^j = \overline{r_{0}{}^j}$, and $r_{1-}{}^j = \overline{r_{1}{}^j}$, these signals are treated as discrete parameters in the logical equations. FIG. 11 is a circuit diagram showing a structural example of the partial quotient determining cells 1101 and 1141. In this drawing, gates 1211 and 1222 are AND-NOR complex gates, 1212, 1221 are OR-NAND complex gates, and 1231 is an inverter circuit.

The partial remainder $R^{(j+1)}$ after determining the quotient $q_j$ is determined by the following recursion formula:

$$R^{(j+1)} = 2 \times R^{(j)} + D^{(j)} \quad (27)$$

where $D^{(j)} =$ (28)

-continued $$\begin{cases} [0.y_1y_2 \ldots y_n]_{SD2}, & \text{when } q_j = -1 \\ 0, & \text{when } q_j = 0 \\ [1.y_1y_2 \ldots y_n]_{SD2} + [0.00 \ldots 1]_{SD2} & \text{when } q_j = 1 \end{cases}$$

Here, $\bar{1}$ represents $-1$ and $\bar{y}_i$ represents a logical negation of $y_i$. This utilizes the fact that the sign negation of $[0.y_1y_2 \ldots y_n]_2$ can be conducted by obtaining a 2's complement binary number. Furthermore, $2 \times R^{(j)}$ can be obtained by shifting $R^{(j)}$ left by one digit. However, $[\ldots]_2$ represents a binary representation.

In addition to the above-described redundant binary numbers and binary numbers, the internal carry and the internal sum are determined in accordance with the rule shown in Table 7.

TABLE 7

A Law Of Calculation Of A Redundant Binary Number (augend) With A Binary Number (addend)

| augend | addend | internal carry (c) | internal sum (s) |
|--------|--------|--------------------|------------------|
| 1 | 1 | 1 | 0 |
| 1 | 0 | 1 | $-1$ |
| 0 | 1 | 1 | $-1$ |
| 0 | 0 | 0 | 0 |
| $-1$ | 1 | 0 | 0 |
| $-1$ | 0 | 0 | $-1$ |

As a result of this, the carry calculation can be arranged to propagate no more than one digit, and parallel addition by a combined circuit can be performed within a predetermined time period regardless of the number of digits of the number to be operated upon. The additions of redundant binary numbers and binary numbers are conducted hereinafter in accordance with the above described law of calculation.

In this state, the first digit $d_i^j$, internal carry $c_i^j$, and internal sum $s_i^j$ of the above described recursion formula (27) can be determined by the following logical equations.

$$d_i^j = q_{j+}y_i + q_{j-}\bar{y}_i \tag{29}$$

$$s_i^j = r_{i+1d}^j \oplus d_i^j \tag{30}$$

$$c_i^j = r_{i+1s}^j \cdot (r_{i+1d}^j + d_i^j) \tag{31}$$

Furthermore, the final sum $r_i^{j+1}$ can be given as a two-bit signal represented by $$r_{is}^{j+1} = s_i^j + c_{i+1}^j \tag{32}$$

$$r_{id}^{j+1} = s_i^j \oplus c_{i+1}^j \tag{33}$$

In these equations, $\oplus$ represents an exclusive logical sum (EX-OR). The simple equations, eq.(32) and (33), and the simple structure of a circuit to determine $s_i$ and $c_i$ can be obtained by using the above-described two-bit signals $r_a$ and $r_s$. However if the signals $r_+$ and $r_-$ are used, which are similar to those used in a case where the quotient is determined, the following equations can be obtained, whereby the number of transistors and the number of stages of gates required to determine $s_i$ are increased:

$$s_i^j = (r_{i+1+}^j + r_{i+1-}^j) \oplus d_i^j \tag{34}$$

$$c_i^j = r_{i+1+}^j + r_{i+1-}^j \cdot d_i^j \tag{35}$$

$$r_{i+}^{j+1} = s_i^j \bar{c}_i^j \tag{36}$$

$$r_{i-}^{j+1} = \bar{s}_i^j \cdot c_i^j \tag{37}$$

Therefore, the structure of a circuit to determine $s_i$ and $c_i$ can be simplified by using the binary format of $r_a$ and $r_s$.

Figure 12:
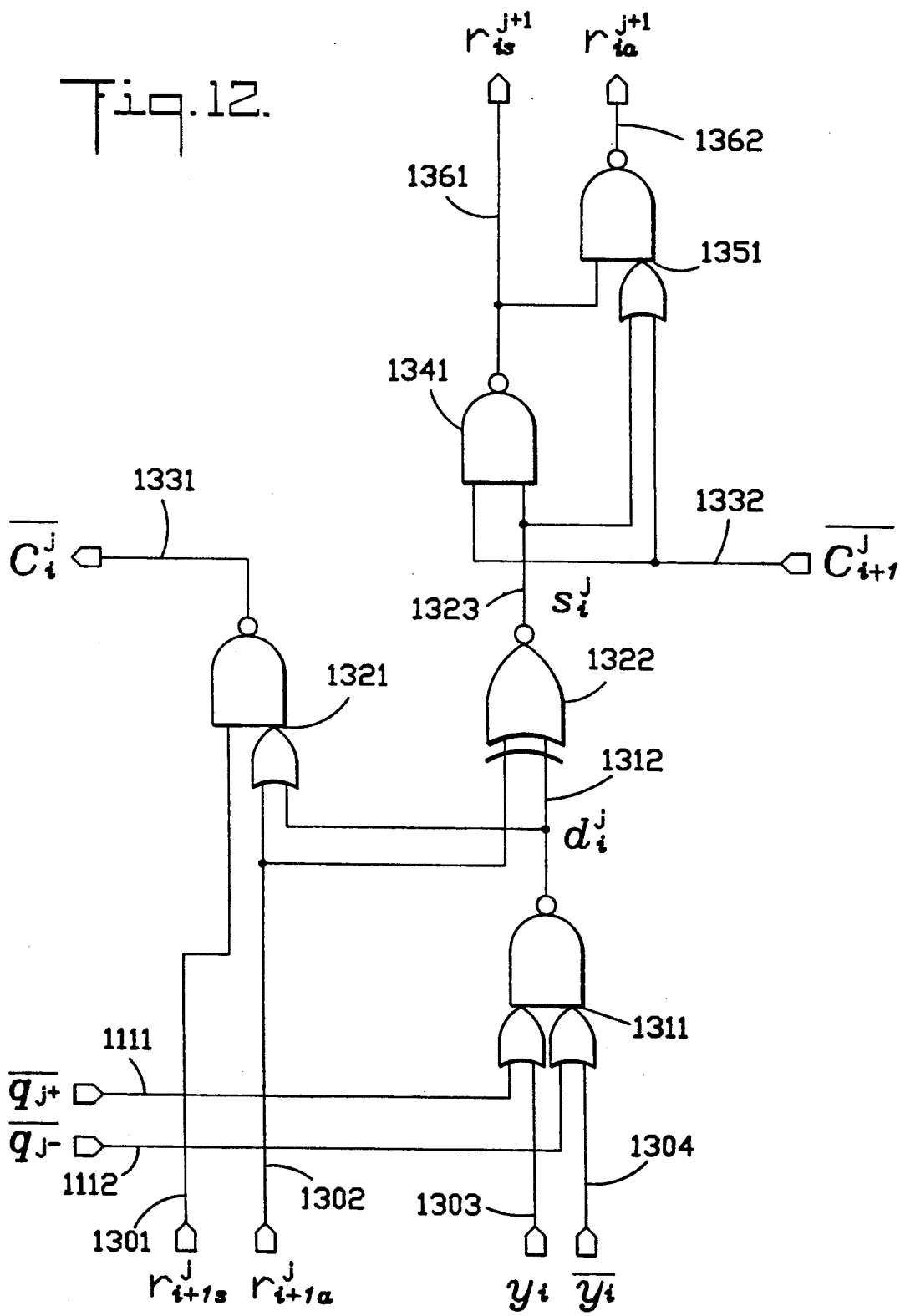
FIG. 12 is a circuit diagram of a cell for determining the digits of lower order than the fourth digit of the partial remainder used in the divider shown in FIG. 10.

FIG. 12 is a circuit diagram illustrating a structural example of the partial remainder determining cells 1105, 1106, ..., and 1145, 1146, ... the partial remainder being lower than the fourth digit shown in FIG. 10. In this figure, gates 1311, 1321, and 1351 are OR-NAND complex gates, 1322 is an exclusive OR gate, and 1341 is a NAND gate. $r_{i+1s}^j$ 1301 and $r_{i+1d}^j$ 1302 are two-bit signals representing the partial remainder $r_{i+1}^j$, $y_i$ 1303 is a divider of the i-th decimal point, $\bar{y}_i$ is a negation signal of the former, $c_i^j$ 1331 is a negation signal of the carry $c_i^j$ to the higher order digit, $c_{i+1}^j$ 1332 is a negation signal of the carry $c_{i+1}^j$ from the lower order digit, $d_i^j$ 1312 is a one-bit signal representing the internal sum at the i-th decimal point, $s_i^j$ 1323 is a one-bit signal representing the internal sum at the i-th decimal point. Furthermore, $r_{is}^{j+1}$ 1361 and $r_{id}^{j+1}$ 1362 are two-bit signals representing the i-th decimal point $r_i^{j+1}$ of the partial remainder after the quotient $q_j$ has been determined.

Figure 13:
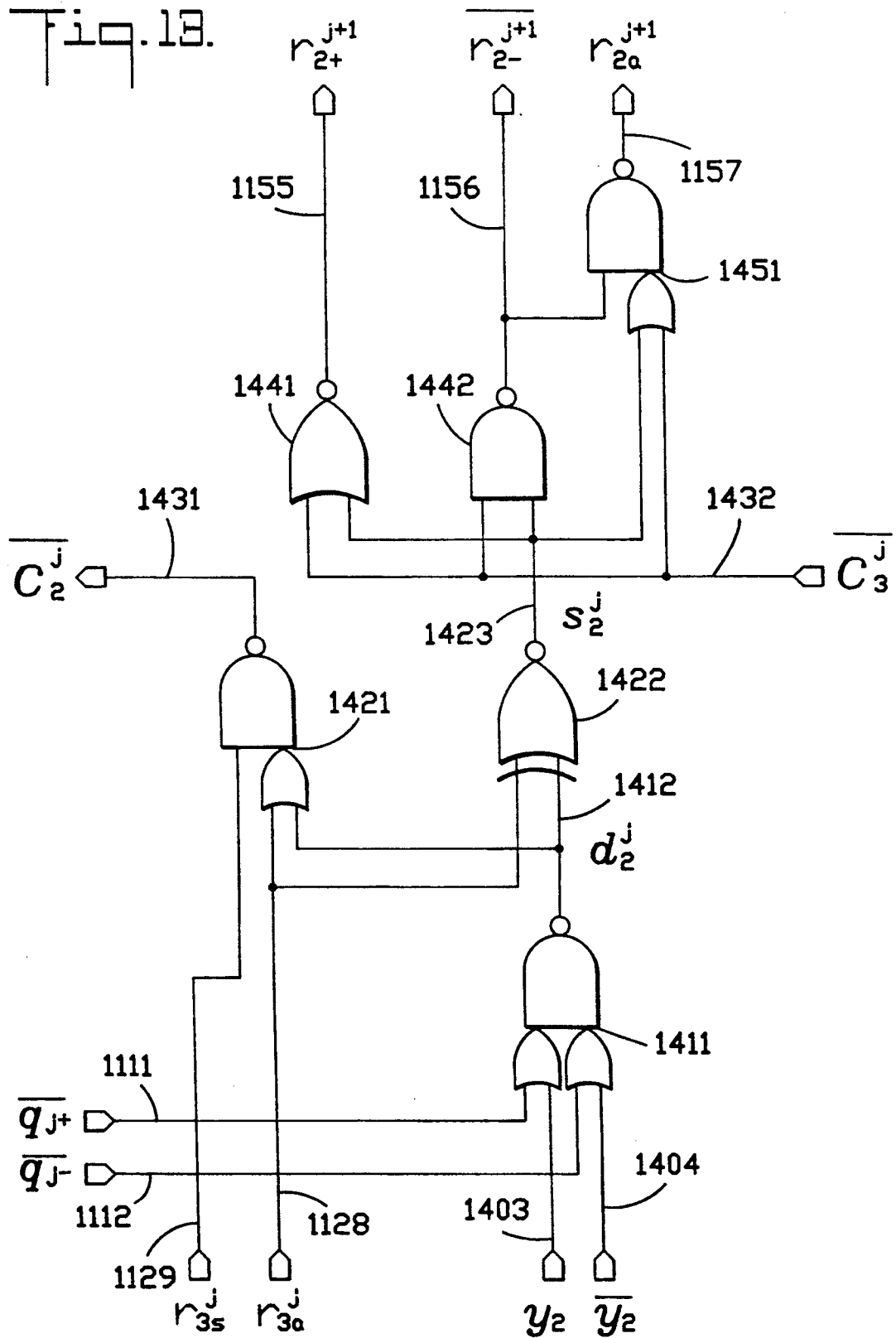
FIG. 13 is a circuit diagram of a cell for determining the third most significant digit of the partial remainder used in the divider shown in FIG. 10.

FIG. 13 is a circuit diagram illustrating a structural example of the third digit of the partial remainder determining cells 1104 and 1144. The third digit of the partial remainder is represented by two encoding formats using two-bit signals $r_{2+}^{j+1}$ 1155 and $r_{2-}^{j+1}$ 1156 or $r_{2-}^{j+1}$ 1156 and $r_{2d}^{j+1}$ 1157. However, $r_{2-}^{j+1}$ is a similar signal to $r_{2s}^{j+1}$. The first binary format is used to determine the next state quotient and the uppermost digit of the partial remainder $r_0^{j+2}$, and the second binary format is used to determine the second digit $r_1^{j+2}$ of the next state partial remainder. However, in order to simplify the circuit structure in this embodiment, only one two-bit signal $r_{2d}^{j+1}$ is used to determine the second digit of the partial remainder. $r_{2+}^{j+1}$ and $r_{2-}^{j+1}$ can be determined by the following logical equations.

$$r_{2+}^{j+1} = s_2^j \cdot \bar{c}_3^j \tag{38}$$

$$r_{2-}^{j+1} = \bar{s}_2^j \cdot c_3^j \tag{39}$$

In this place, $s_2^j$ is an internal sum determined by the equation (30), and $c_3^j$ is an internal carry determined by the equation (31). In this figure, gates 1411, 1421, 1422, 1442 and 1451 are the same as those shown in FIG. 3, and gate 1441 is a NOR gate.

Furthermore, the two-bit signal representing the second digit of the partial remainder is determined by the local equations (40) and (41).

$$r_{1+}^{j+1} = (q_{j-} \oplus r_{2d}^j) \cdot c_2^j \tag{40}$$

$$r_{1-}^{j+1} = (q_{j-} \oplus r_{2d}^j) \cdot \bar{c}_2^j \tag{41}$$

Figure 14:
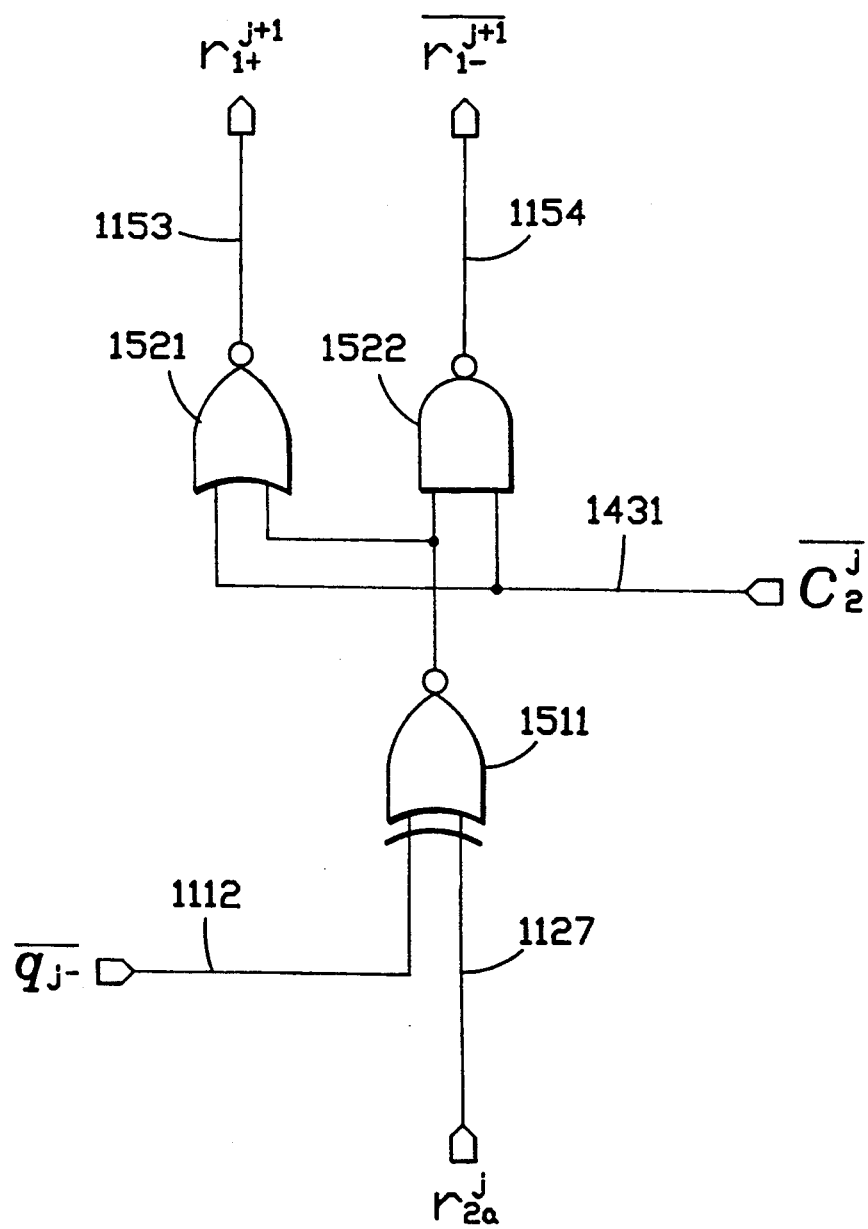
FIG. 14 is a circuit diagram illustrating a cell for determining the second most significant digit of the partial remainder used in the divider shown in FIG. 10.

FIG. 14 is a circuit diagram showing a structural example of the cells 1103 and 1143 for determining the second digit of the partial remainder shown in FIG. 10. In this figure, a gate 1511 is an exclusive NOR gate, 1521 is a NOR gate, and 1522 is a NAND gate.

The highest order digit $r_0^{j+1}$ of the partial remainder $R^{(j+1)}$ is, in a manner similar to the quotient, determined by the following equations in such a manner that the digits thereof do not extend to the upper digits from the upper three digits $[r_0^j \cdot r_1^j r_2^j]_{SD2}$ of the partial remainder $R^{(j)}$:

$$r_{0+}{}^{j+1} = r_{0+}{}^{j}(r_{1-}{}^{j} + r_{2+}{}^{j}) + r_{0-}{}^{j}r_{1+}{}^{j} + r_{2+}{}^{j} \quad (42)$$

$$r_{0-}{}^{j+1} = r_{0-}{}^{j}(r_{1+}{}^{j} + r_{2-}{}^{j}) + r_{0+}{}^{j}r_{1-}{}^{j} - r_{2-}{}^{j} \quad (43)$$

Figure 15:
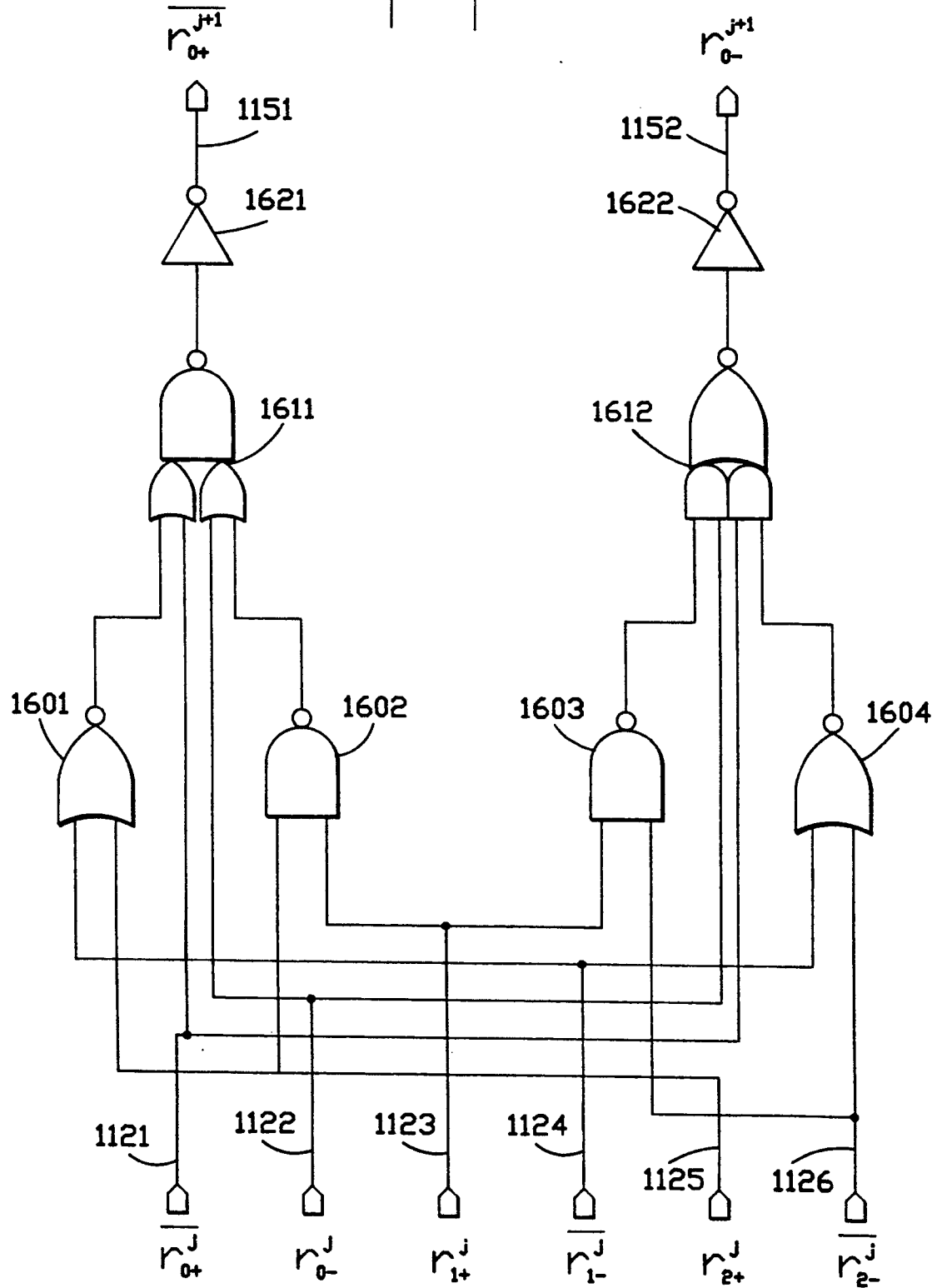
FIG. 15 is a circuit diagram of a cell for determining the most significant digit of the partial remainder used in the divider shown in FIG. 10.

FIG. 15 is a circuit diagram illustrating a structural example of cells 1102 and 1142 for determining the higher order digit of the partial remainder. In this figure, gates 1601 and 1604 are NOR gates, 1602 and 1603 are NAND gates, 1611 is an OR-NAND gate, 161 is an AND-NOR gate, and 1621 and 1622 are inverters.

In the above-described second embodiment, with the use of the different binary encoding formats to represent the three higher order digits of the partial remainder used for determining a digit of a quotient, and the following digits, the number of stages of gates required in the corresponding circuit can be reduced, whereby division can be conducted at higher speed.

Thus, in an arithmetic processor using signed-digit representation for the internal arithmetic operation, the use of a suitable binary encoding format chosen in accordance with the digits, to represent each digit of a number to be operated upon, permits the number of devices to be reduced, whereby the operations can be conducted at higher speeds.

Finally, an embodiment will now be described in which a multiplier and a divider are formed from individual circuit components. Specifically, in this embodiment, an example of an arithmetic processor will be described, which treats single-precision normalized floating-point numbers, in the format regulated by the IEEE Standard for Binary Floating-Point Arithmetic (ANSI/IEEE Std 754-1985).

First, the single precision normalized floating-point number format regulated by the IEEE 754 Standard and a floating point multiplier and a floating-point divider will be described. The single-precision normalized floating point number format regulated by the IEEE 754 Standard can be expressed by the following equation:

$$(-1)^s \cdot 2^{e-127} \cdot (1 \cdot f) \quad (44)$$

In the equation (44), symbol s represents a sign bit, e represents an 8-bit exponent which is displaced in the positive direction by 127, and f represents a 23 bit mantissa.

First, multiplication is considered. Assuming that a multiplicand X and a multiplier Y are $$X = (-1)^{sx} 2^{ex-127}(1 \cdot f_X) \quad (45)$$

$$Y = (-1)^{sx} 2^{ey-127}(1 \cdot f_Y) \quad (46).$$

a product P can be expressed by the following equation.

$$\begin{aligned} p &= X \cdot Y \\ &= (-1)^{sX+sY} 2^{(eX+eY-127)-127}(1 \cdot f_X)(1 \cdot f_Y) \\ &= (-1)^{sP} 2^{(eP-127)}(1 \cdot f_p) \end{aligned} \quad (47)$$

Therefore, the structure of the multiplier can be realized by, for example, a sign-determining circuit for determining the sign bit $s_p$, an exponent adder for determining the exponent $e_p$, and a mantissa determinator for determining the mantissa $f_p$. The major portion of the mantissa determinator is an adder tree which adds the partial products, and this tree can be realized by an adder unit which uses redundant binary numbers for the internal operations number shown in the first embodiment.

Next, division will be considered. Assuming that the dividend is X, and divider is Y, each equation can be expressed by (45) and (46), the quotient Q can be expressed by the following equation.

$$\begin{aligned} Q &= X/Y \\ &= (-1)^{sX-sY} 2^{(eX-eY+127)-127}(1 \cdot f_X)/(1 \cdot f_Y) \\ &= (-1)^{sQ} 2^{(eq-127)}(1 \cdot f_q) \end{aligned} \quad (48)$$

The structure of the divider can be realized, for example, by a sign determinator for determining sign bit $s_q$, an exponent adder for determining the exponent $e_q$, and a mantissa adder for determining the mantissa $f_q$. The major portion of the mantissa determinator can be formed by the shift subtracting divider shown in a previous embodiment.

Figure 16:
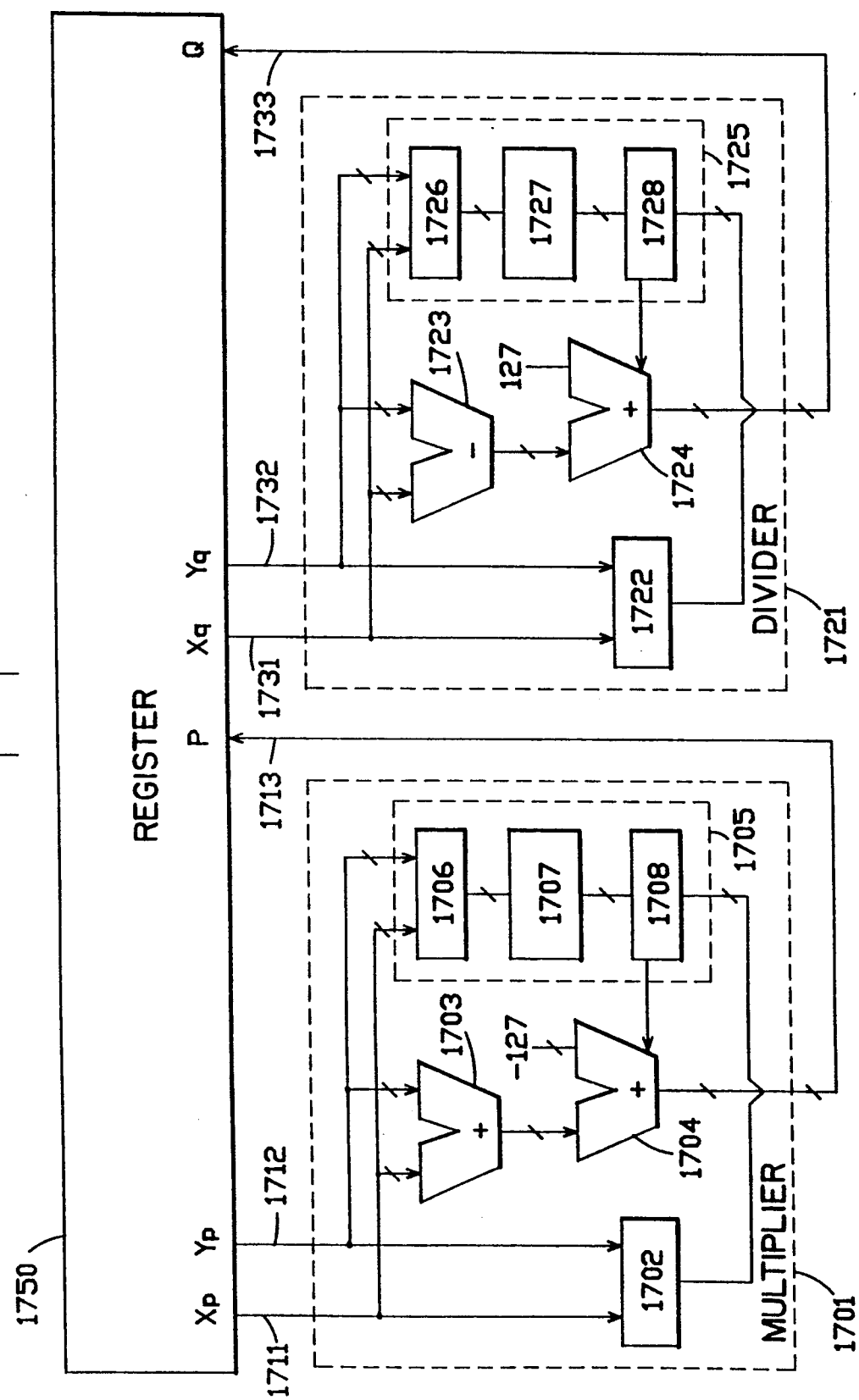
FIG. 16 is a block diagram of an arithmetic processor which integrates the multiplier and the divider according to an embodiment of this invention.

FIG. 16 is a structural view illustrating an arithmetic processor which is embodied by the present invention. Reference numeral 1701 represents a floating point multiplier, reference numeral 1711 represents a multiplicand $x_p$, reference numeral 1712 represents a multiplier $y_p$, and reference number 1713 represents a product P. The floating-point multiplier 1701 according to this embodiment is formed as follows; reference numeral 1702 represents a sign-determinator, reference numeral 1703 represents an adder for adding the exponent of $x_p$ 1711 and the exponent of $y_p$ 1712. Reference numeral 1704 represents an adder for adding the output from the adder 1703 with −127 for correcting the displacement of the exponent and the carrying signal for normalizing the mantissa. Reference numeral 1705 represents a mantissa determinator, reference number 1706 represents a partial product generator which is a component of the mantissa determinator 1705. Reference number 1701 represents a partial product adder circuit for adding the partial products, the partial product adder circuit being a component of the mantissa determinator 1705. Reference numeral 1708 represents a conversion circuit for converting the product to a binary numeral, the product being originally obtained in the form of a redundant binary number. As is well known, the partial products are set off by a one bit digit, and the partial product adder circuit can be formed by the adder unit shown in the first embodiment. Reference numeral 1721 represents a floating-point divider, reference numeral 1731 represents a dividend $x_q$, reference numeral 1732 represents a divider $y_q$, and reference numeral 1733 represents a quotient Q. The floating-point divider 1721 according to this embodiment is formed as follows; reference numeral 1722 represents a sign determinator, reference numeral 1723 represents a subtractor for subtracting an exponent of $y_q$ 1732 from the exponent of $X_q$ 1731. Reference numeral 1724 represents an adder for adding 127 for correcting the displacement between the output from the subtractor 1723 and the exponent and a digit-borrowing signal for normalizing the mantissa. Reference numeral 1725 represents a mantissa determinator, reference numeral 1726 represents a partial remainder determinator which forms the mantissa determinator 1725. Reference numeral 1728 represents a conversion circuit for converting the quotient to a binary numbers, the quotient being obtained in the form of a redundant binary number, and the conversion circuit forming the mantissa determinator 1725. The quotient determinator 1726 and the mantissa determinator 1727 can be formed by the shift subtracting divider shown above. Reference numeral 1750 represents a register for retaining data, the register reading the multiplicand $x_p$ 1711 and the multiplier $y_p$ 1712 and supplying the same to the floating-point multiplier 1701, and receiving and writing the obtained product P 1713. The register 1750 also reads the dividend $x_q$ 1731 and the divider $y_q$ 1732 and supplies the same to the floating-point divider 1721, and receives and writes the obtained quotient Q 1733. This can be realized by a multiport register of multi-input and multi-output type. By reading and writing a plurality of arithmetic operands wit the use of this register file 1750, the floating-point multiplier 1701 and the floating-point divider 1721 which are formed by individual hardware components can be operated in parallel. Although the floating-point multiplier and the floating-point divider are shown in this embodiment, it is apparent that a multiplier and a divider which uses as the arithmetic operands integers or fixed point numbers can be readily realized by each mantissa determinator shown in this embodiment.

Accordingly to this embodiment, significant advantages can be obtained, these advantages being that a high-speed multiplier and divider can be formed by the individual hardware elements, multiplication and division can be operated in parallel, and the volume of circuitry hardware can be reduced by using the adder unit disclosed herein and the shift subtracting divider disclosed herein in the internal arithmetic operations units.

Although the above-described embodiments realize the invention by a binary logic consistent with MOS circuit design other circuit technologies (for example NMOS, ECL, TTL, and IIL) or a higher radix logic may be utilized to realize the same objects of the invention. The exclusive OR and NOR gates shown in the embodimnets may be realized by a combination of complex gates and NAND or NOR gates, and it may be realized by 6-transistors using a transfer gate. Furthermore, it is also well known in the art that a NAND gate which is combined with an inverter can be readily used to replace a NOR gate and that a complex gate can be also readily be formed by combination of NAND or NOR gates.

Thus, many variations and modifications, and other embodiments of the invention described herein will be apparent to one skilled in the art. The scope of the invention described herein is not limited to the particular embodiments which have been described, but rather extends to include all other embodiments and modifications apparent to one skilled in the art.

What is claimed is:

1. An arithmetic processor comprising an adder tree for generating a final sum of a plurality of numbers, each of which is internally represented as a signed-digit number, said adder tree having a plurality of intermediate adder stages and a final adder stage, each adder stage having one or more adders for adding an augend and an addend pair, each pair being one of said plurality of numbers or a partial sum obtained as the result of an addition in a preceding intermediate adder stage, said augend and addend pair having an overlapping portion wherein the digits of said augend overlap digits of said addend and a non-overlapping portion caused by the augend being offset with respect to said addend, said intermediate adder stages of said adder tree including:

a) one or more first type adders each having first type logic circuitry for adding the digits of said augend and addend in said overlapping portion to generate part of said partial sum for application to an adder in a subsequent adder stage, generating a carry resulting from the addition of the highest order digits of said overlapping portion, and directly applying all of the higher order digits forming the non-overlapping portion to said subsequent adder stage to form part of the partial sum therein; and b) a second type adder including second type logic circuitry for adding the digits of said augend and addend in said overlapping portion to generate part of said partial sum for application to an adder in a subsequent adder stage, generating a carry resulting from the addition of the highest order digits of said overlapping portion, and adding zeros placed in the non-overlapping portions of the augend and any carries output from said first type adders of a preceding stage to said higher order digits of said addend.

2. An arithmetic processor utilizing signed-digit internal operands for determining a quotient resulting from division of a dividend by a divisor by generating a plurality of successive partial remainders $R(j)$, each of said successive partial remainders and digits of said quotient being denoted by an index j, each digit of said signed-digit internal operands capable of being represented by binary signals chosen in accordance with a plurality of encoding rules, said arithmetic processor comprising:

a) quotient determining circuitry for generating the qth digit of said quotient expressed by binary signals selected in accordance with a first of said plurality of encoding rules, said quotient determining circuitry having input thereto the three most significant digits of the (j)th partial remainder $R(j)$ expressed in accordance with said first of said plurality of encoding rules;

b) first circuitry for generating the most significant digit of the (j+1)th partial remainder $R(j+1)$ expressed by binary signals selected in accordance with a first of said plurality of encoding rules, said first circuitry having input thereto the three most significant digits of the (j)th partial remainder $R(j)$ expressed in accordance with said first of said plurality of encoding rules;

c) second circuitry for generating the second most significant digit of the (j+1) th partial remainder $R(j+1)$ expressed by binary signals selected in accordance with said first of said plurality of encoding rules, said second circuitry having input thereto binary signals representing the third significant digit of the (j)th partial remainder $R(j)$ expressed in accordance with said second of said plurality of encoding rules:

d) third circuitry for generating the third most significant digit of the (j+1)th partial remainder $R(j+1)$ expressed by binary signals selected in accordance with said first of said plurality of encoding rules, said third circuitry having input thereto binary signals representing the fourth significant digit of the (j)th partial remainder $R(j)$ expressed in accordance with said second of said plurality of encoding rules, said qth digit of said quotient, and the most significant digit of said divisor; and e) fourth circuitry for generating the fourth and subsequent digits of the (j+1)th partial remainder $R(j+1)$ expressed by binary signals selected in accordance with said second of said plurality of encoding rules, said fourth circuitry having input thereto the fifth and subsequent digits from the (j)th partial remainder R(j) expressed by binary signals selected in accordance with said second of said encoding rules, said qth digit of said quotient and the second and subsequent digits of said divisor.

3. An arithmetic processor having an adder tree for generating a final sum of a plurality of numbers, each of which is internally represented as a signed-digit number, said adder tree having a plurality of intermediate adder stages and a final adder stage, each adder stage having one or more adders for adding an augend and an addend pair, each pair being one of said plurality of numbers or a partial sum obtained as the result of an addition in a preceding intermediate adder stage, said augend and addend pair having an overlapping portion wherein the digits of said augend overlap digits of said addend and a non-overlapping portion caused by the augend being offset with respect to said addend, each of said intermediate adder stages comprising:

(a) one or more first type adders each having first type logic circuitry for adding the digits of said augend and addend in said overlapping portion to generate part of said partial sum for application to an adder in a subsequent adder stage, generating a carry resulting from the addition of the highest order digits of said overlapping portion, and directly applying all of the higher order digits forming the non-overlapping portion to said subsequent adder stage to form part of the partial sum therein; and (b) a second type adder including second type logic circuitry for adding the digits of said augend and said addend in said overlapping portion to generate part of said partial sum for application to an adder in a subsequent adder stage, generating a carry resulting from the addition of the highest order digits of said overlapping portion, and adding zeros placed in the non-overlapping portions of the augend and any carries output from said first type adders of a proceeding stage to said higher order digits of said addend;

said final adder stage of said adder tree including a second type adder for generating said final sum.

* * * * *

UNITED STATES PATENT AND TRADEMARK OFFICE
CERTIFICATE OF CORRECTION

PATENT NO. : 5,153,847
DATED : October 6, 1992
INVENTOR(S) : Takagi et al.

It is certified that error appears in the above-indentified patent and that said Letters Patent is hereby corrected as shown below:

Col. 4, line 61   Table 3 should be reproduced as follows:

Table 3

| $x_i$ | $y_i$ | $x_i+y_i$ | $p_i$ | $p_{i-1}$ | $c_i$ | $s_i$ | $B_i = c_i + \bar{p}_i$ | $R_i = s_i + p_{i-1}$ |
|---|---|---|---|---|---|---|---|---|
| 1 | 1 | 2 | 1 | 1 / 0 | 1 | 0 | 1 | 1 / 0 |
| 1 / 0 | 0 / 1 | 1 | 1 | 1 / 0 | 1 / 0 | -1 / 1 | 1 / 0 | 0 / 1 |
| 0 / 0 / -1 | 0 / -1 / 1 | 0 | 1 / 0 | 1 / 0 | 0 | 0 | 0 / 1 / 1 | 1 / 0 |
| -1 / 0 | 0 / -1 | -1 | 0 | 1 / 0 | 0 / -1 | -1 / 1 | 1 / 0 | 0 / 1 |
| -1 | -1 | -2 | 0 | 1 / 0 | -1 | 0 | 0 | 1 / 0 |

Col. 5, line 45   "$Z_{is} = \overline{R_{is} + B_{i-1}}$" should be

--$Z_{is} = \overline{R_{is} + B_{i-1}}$--

UNITED STATES PATENT AND TRADEMARK OFFICE
CERTIFICATE OF CORRECTION

PATENT NO. : 5,153,847
DATED : October 6, 1992
INVENTOR(S) : Takagi et al.

It is certified that error appears in the above-indentified patent and that said Letters Patent is hereby corrected as shown below:

Col. 8, line 5 "$\overline{B_{i-1}}$" should be -- $\overline{\overline{B_{i-1}}}$ --

Col. 8, line 8 "$P_{i-1}$" should be -- $\overline{P_{i-1}}$ --

Col. 8, line 29 "(10)." should be --(10),--

Col. 8, line 33 "$p_i = Y_{\overline{is}}$" should be -- $p_i = \overline{Y_{is}}$ --

Col. 8, line 50 "$B_{i-1}$" should be -- $\overline{B_{i-1}}$ --

Col. 8, line 51 "$B_i 1$" should be -- $B_{i-1}$ --

Col. 8, line 53 "$P_{i-1}$" should be -- $\overline{P_{i-1}}$ --

Col. 9, line 6 "$z_{is}=P_{i-1}+B_{i-1}$" should be

-- $z_{is}=\overline{P_{i-1}+B_{i-1}}$ --

Col. 9, line 8 "$z_{ia}=P_{i-1}\oplus B_{i-1}$" should be

-- $z_{ia}=\overline{P_{i-1}\oplus B_{i-1}}$ --

Col. 9, line 15 "$B_{i-1}$" should be -- $\overline{B_{i-1}}$ --

Col. 9, line 17 "$P_{i-1}$" should be -- $\overline{P_{i-1}}$ --

UNITED STATES PATENT AND TRADEMARK OFFICE
CERTIFICATE OF CORRECTION

PATENT NO. : 5,153,847
DATED : October 6, 1992
INVENTOR(S) : Takagi, et al

It is certified that error appears in the above-indentified patent and that said Letters Patent is hereby corrected as shown below:

Col. 9, line 29   "$P_{i-1} = B_{i-1} = 0,$" should be

-- $P_{i-1} = \overline{B_{i-1}} = 0,$ --

Col. 9, line 32   "$P_i = x_{is} + y_{is}$" should be

-- $P_i = \overline{x_{is} + y_{is}}$ --

Col. 9, line 34   "$B_i = x_{ia} \cdot y_{ia} \cdot x_{is} \cdot y_{is}$"

should be

-- $B_i = x_{ia} \cdot y_{ia} \cdot \overline{x_{is} \cdot y_{is}}$ --

Col. 11, line 19   Table 5 should be reproduced as follows:

Table 5

Different Formats för Logical Representation Of $\{-1, 0, 1\}$

|    | $I_+$ | $I_-$ |
|----|-------|-------|
| 1  | 1     | 0     |
| 0  | 0     | 0     |
| -1 | 0     | 1     |

|    | $I_a$ | $I_s$ |
|----|-------|-------|
| 1  | 1     | 1     |
| 0  | 0     | 1     |
| -1 | 1     | 0     |

|    | $I_o$ | $I_n$ |
|----|-------|-------|
| 1  | 0     | 0     |
| 0  | 1     | 1     |
| -1 | 0     | 1     |

UNITED STATES PATENT AND TRADEMARK OFFICE
CERTIFICATE OF CORRECTION

PATENT NO. : 5,153,847
DATED : October 6, 1992
INVENTOR(S) : Takagi et al.

It is certified that error appears in the above-indentified patent and that said Letters Patent is hereby corrected as shown below:

Col. 11, line 43  "$R^{(j-1)} = r \times R^{(j)} - q_j \times D$" should be
$$R^{(j+1)} = r \times R^{(j)} - q_j \times D$$

Col. 11, line 57  "Blocks and 1141" should be --Blocks 1101 and 1141--

Col. 11, line 65  "$r_{0+}^{j}$ 1121 and $r_{0-j}$ 1122" should be -- $\overline{r_{0+}^{j}}$ 1121 and $r_{0-}^{j}$ 1122 --

Col. 11, line 68  "$r_{1-}^{j}$ 1124" should be -- $\overline{r_{1-}^{j}}$ 1124 --

Col. 12, line 1  "$r_{2-}^{j}$ 1126" should be -- $\overline{r_{2-}^{j}}$ 1126 --

Col. 12, line 4  "$r_{0+}^{j+1}$ 1151" should be -- $\overline{r_{0+}^{j+1}}$ 1151 --

Col. 12, ll. 4-5  "$r_{1-}^{j+1}$ 1154" should be -- $\overline{r_{1-}^{j+1}}$ 1154 --

UNITED STATES PATENT AND TRADEMARK OFFICE
CERTIFICATE OF CORRECTION

PATENT NO. : 5,153,847
DATED : October 6, 1992
INVENTOR(S) : Takagi et al.

It is certified that error appears in the above-indentified patent and that said Letters Patent is hereby corrected as shown below:

Col. 12, line 5   "$r_{2-}^{j+1}$ 1156" should be -- $\overline{r_{2-}^{j+1}}$ 1156 --

Col. 12, line 8   "its" should be --order digits--

Col. 12, line 31  "$[r_0^j \cdot r_1^j \; r_2^j]_{SD2}$" should be
-- $[r_0^j \cdot r_1^j r_2^j]_{SD2}$ --

Col. 12, line 45  "$q_{j+} = r_{0+}^j + r_{0-}^j \cdot (r_{1+}^j + r_{1-}^j \; r_{2+}^j)$"

should be

-- $q_{j+} = r_{0+}^j + \overline{r_{0-}^j} \cdot (r_{1+}^j + \overline{r_{1-}^j} \; r_{2+}^j)$ --

Col. 12, line 47  "$q_{j-} = r_{0-}^j + r_{0+}^j \cdot (r_{1-}^j + r_1^j + r_{2-}^j)$"

should be

-- $q_{j-} = r_{0-}^j + \overline{r_{0+}^j} \cdot (r_{1-}^j + \overline{r_{1+}^j} r_{2-}^j)$ --

UNITED STATES PATENT AND TRADEMARK OFFICE
CERTIFICATE OF CORRECTION

PATENT NO. : 5,153,847
DATED : October 6, 1992
INVENTOR(S) : Takagi et al.

It is certified that error appears in the above-indentified patent and that said Letters Patent is hereby corrected as shown below:

Col. 12, line 51    "$r^j_{0+}, r^j_{0-}, r^j_{1+},$ and $r^j_{1-},$"

should be

-- $\overline{r^j_{0+}}, \overline{r^j_{0-}}, \overline{r^j_{1+}},$ and $\overline{r^j_{1-}},$ --

Col. 13, line 5    "$[1 \cdot y_1 y_2 \ldots y_n]_{SD2} + [0.00\ldots 1]_{SD2}$"

should be

"$[I \cdot \overline{y}_1 \overline{y}_2 \ldots \overline{y}_n]_{SD2} + [0.00\ldots 1]_{SD2}$"

Col. 13, line 7    "1 represents" should be --I represents--

Col. 13, line 13    "$[\ldots]_2$" should be --$[\ldots]_2$--

Col. 13, line 42    "$d^j_i = q_{j+} y_i + q_{j-} y_i$" should be

-- $d^j_i = q_{j+} \overline{y_i} + q_{j-} y_i$ --

Col. 13, line 44    "$s^j_i = r^j_{i+1a} \oplus d^j_i$" should be

-- $s^j_i = r^j_{(i+1)a} \oplus d^j_i$ --

UNITED STATES PATENT AND TRADEMARK OFFICE
CERTIFICATE OF CORRECTION

PATENT NO. : 5,153,847
DATED : October 6, 1992
INVENTOR(S) : Takagi et al.

It is certified that error appears in the above-indentified patent and that said Letters Patent is hereby corrected as shown below:

Col. 13, line 46  "$c_i^j = r_{i+1s}^j \cdot (r_{i+1a}^j + d_i^j)$"

should be

-- $c_i^j = r_{(i+1)s}^j \cdot (r_{(i+1)a}^j + d_i^j)$ --

Col. 13, line 65  "$s_i^j = (r_{i+1+}^j + r_{i+1-}^j) \oplus d_i^j$"

should be

-- $s_i^j = (r_{i+1+}^j + r_{i+1-}^j) \oplus d_i^j$ --

Col. 13, line 67  "$c_i^j = r_{i+1+}^j + r_{i+1-}^j \cdot d_i^j$"

should be

-- $c_i^j = r_{i+1+}^j + \overline{r_{i+1-}^j} \cdot d_i^j$ --

Col. 14, line 1  "$r_{i+}^{j+1} = s_i^j c_i^j$" should be

-- $r_{i+}^{j+1} = \overline{s_i^j} c_i^j$ --

UNITED STATES PATENT AND TRADEMARK OFFICE
CERTIFICATE OF CORRECTION

PATENT NO. : 5,153,847
DATED : October 6, 1992
INVENTOR(S) : Takagi et al.

It is certified that error appears in the above-indentified patent and that said Letters Patent is hereby corrected as shown below:

Col. 14, line 3    "$r_{i-}^{j+1} = s_i^j \cdot c_i^j$" should be $$-- \; r_{i-}^{j+1} = s_i^j \cdot \overline{c_i^j} \; --$$

Col. 14, line 14    "$r_{i+1s}^j$ and $r_{i+1a}^j$" -- should be $$-- \; r_{(i+1)s}^j \text{ and } r_{(i+1)a}^j \; --$$

Col. 14, line 16    "$y_i$" should be -- $\overline{y_i}$ --

Col. 14, line 17    "$c_i^j$" should be -- $\overline{c_i^j}$ --

Col. 14, line 18    "$c_{i+1}^j$ 1332" should be -- $\overline{c_{i+1}^j}$ 1332 --

Col. 14, line 30    "$r_{2-}^{j+1}$ 1156 or $r_{2-}^{j+1}$" should be $$-- \; \overline{r_{2-}^{j+1}} \; 1156 \text{ or } \overline{r_{2-}^{j+1}} \; --$$

UNITED STATES PATENT AND TRADEMARK OFFICE
CERTIFICATE OF CORRECTION

PATENT NO. :
DATED :
INVENTOR(S) :

It is certified that error appears in the above-indentified patent and that said Letters Patent is hereby corrected as shown below:

Col. 14, line 31  "$r_{2-}^{j+1}$" should be -- $\overline{r_{2-}^{j+1}}$ --

Col. 14, line 39  "$r_{2-}^{j+1}$" should be -- $\overline{r_{2-}^{j+1}}$ --

Col. 14, line 43  "$r_{2-}^{j+1}=s_2^j \cdot c_3^j$" should be

-- $\overline{r_{2-}^{j+1}}=\overline{s_2^j}+c_3^j$ --

Col. 14, line 54  "$r_{1+}^{j+1}=(q_{j-} \oplus r_{2a}^j) \cdot c_2^j$"

should be

-- $r_{1+}^{j+1}=(q_{j-} \oplus r_{2a}^j) \cdot \overline{c_2^j}$ --

Col. 14, line 56  "$r_{1-}^{j+1}=(q_{j-} \oplus r_{2a}^j) \cdot c_2^j$"

should be

-- $r_{1-}^{j+1}=\overline{(q_{j-} \oplus r_{2a}^j)} \cdot c_2^j$ --

UNITED STATES PATENT AND TRADEMARK OFFICE
CERTIFICATE OF CORRECTION

PATENT NO. : 5,153,847
DATED : October 6, 1992
INVENTOR(S) : Takagi et al.

It is certified that error appears in the above-indentified patent and that said Letters Patent is hereby corrected as shown below:

Col. 15, line 1    "$r_{0+}^{j+1} = r_{0+}^{j}(r_{1-}^{j}+r_{2+}^{j})+r_{0-}^{j}r_{1+}^{j}r_{2+}^{j}$"

should be

-- $r_{0+}^{j+1} = r_{0+}^{j}(\overline{r_{1-}^{j}}+r_{2+}^{j})+\overline{r_{0-}^{j}}r_{1+}^{j}r_{2+}^{j}$ --

Col. 15, line 3    "$r_{0-}^{j+1} = r_{0-}^{j}(r_{1+}^{j}+r_{2-}^{j})+r_{0+}^{j}r_{1-}^{j}-r_{2-}^{j}$"

should be

-- $r_{0-}^{j+1} = r_{0-}^{j}(\overline{r_{1+}^{j}}+r_{2-}^{j})+\overline{r_{0+}^{j}}r_{1-}^{j}r_{2-}^{j}$ --

Col. 15, line 9    "161" should be --1612--

Col. 15, line 42    "$(-1)^{s} \cdot 2^{e \cdot 127} \cdot (1 \cdot f)$" should be -- $(-1)^{s} \cdot 2^{e-127} \cdot (1.f)$ --

Col. 15, line 50    "$X=(-1)^{sx} 2^{ex-127}(1 \cdot f_X)$" should be

-- $X=(-1)^{s_X} 2^{e_X-127}(1.f_X)$ --

UNITED STATES PATENT AND TRADEMARK OFFICE
CERTIFICATE OF CORRECTION

PATENT NO. : 5,153,847
DATED : October 6, 1992
INVENTOR(S) : Takagi et al.

It is certified that error appears in the above-indentified patent and that said Letters Patent is hereby corrected as shown below:

Col. 15, line 53    "$Y=(-1)^{sx} 2^{eY-127}(1 \cdot f_Y)$" should be
-- $Y=(-1)^{s_Y} 2^{e_Y-127}(1.f_Y)$ --

Col. 15, line 58    "$=(-1)^{sX+sY} 2^{(eX+eY-127)-127}(1.f_X)(1.f_Y)$" should be
-- $=(-1)^{s_x+s_y} 2^{(e_x+e_y-127)-127}(1.f_X)(1.f_Y)$ --

Col. 15, line 59    "$=(-1)^{sP} 2^{(eP-127)}(1.f_p)$" should be
-- $=(-1)^{s_p} 2^{(e_p-127)}(1.f_p)$ --

Col. 16, line 9    "$=(-1)^{sX-sY} 2^{(eX-eY+127)-127}(1.f_X)/(1.f_Y)$" should be
-- $=(-1)^{s_x-s_y} 2^{(e_x-e_y+127)-127}(1.f_X)/(1.f_Y)$ --

Col. 16, line 24    "number 1713" should be --numeral 1713--

Col. 16, line 34    "number 1706" should be --numeral 1706--

UNITED STATES PATENT AND TRADEMARK OFFICE
CERTIFICATE OF CORRECTION

PATENT NO. : 5,153,847
DATED : October 6, 1992
INVENTOR(S) : Takagi et al.

It is certified that error appears in the above-indentified patent and that said Letters Patent is hereby corrected as shown below:

Col. 16, line 36  "number 1701" should be "numeral 1707"

Col. 17, line 11  "wit" should be --with--

Col. 17, line 21  "Accordingly" should be --According--

Signed and Sealed this

Twenty-seventh Day of September, 1994

Attest:

BRUCE LEHMAN

Attesting Officer

Commissioner of Patents and Trademarks